(12) United States Patent
Marson et al.

(10) Patent No.: US 12,056,219 B2
(45) Date of Patent: Aug. 6, 2024

(54) PROTECTION OF NEURAL NETWORKS BY OBFUSCATION OF NEURAL NETWORK ARCHITECTURE

(71) Applicant: Cryptography Research, Inc., San Jose, CA (US)

(72) Inventors: Mark Evan Marson, Carlsbad, CA (US); Michael Alexander Hamburg, San Francisco, CA (US); Helena Handschuh, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 288 days.

(21) Appl. No.: 17/553,545

(22) Filed: Dec. 16, 2021

(65) Prior Publication Data

US 2022/0197981 A1    Jun. 23, 2022

Related U.S. Application Data

(60) Provisional application No. 63/199,365, filed on Dec. 21, 2020.

(51) Int. Cl.
*G06F 21/14* (2013.01)
*G06N 3/02* (2006.01)

(52) U.S. Cl.
CPC ............. *G06F 21/14* (2013.01); *G06N 3/02* (2013.01)

(58) Field of Classification Search
CPC ...... G06F 21/14; G06F 21/6227; G06F 7/023; G06N 3/02; G06N 3/048; G06N 20/00; H04L 41/16; H04N 21/251; H04N 21/466; H04N 21/45; H04N 21/4662
See application file for complete search history.

(56) References Cited

U.S. PATENT DOCUMENTS

| | | | |
|---|---|---|---|
| 10,210,861 B1* | 2/2019 | Arel | G06N 3/044 |
| 10,733,292 B2 | 8/2020 | Araujo et al. | |
| 2018/0276508 A1* | 9/2018 | Crabtree | G06Q 10/063112 |
| 2020/0311540 A1 | 10/2020 | Chakraborty et al. | |
| 2021/0319098 A1* | 10/2021 | Pogorelik | G06N 5/04 |
| 2022/0197981 A1* | 6/2022 | Marson | G06F 21/14 |
| 2023/0325627 A1* | 10/2023 | Ming Chang | G06N 3/08 706/15 |

OTHER PUBLICATIONS

Batina, Lejla et al., "CSI NN: Reverse Engineering of Neural Network Architectures Through Electromagnetic Side Channel", Proceedings of the 28th USENIX Security Symposium, Aug. 14-16, 2019, Santa Clara, CA. 19 pages.

(Continued)

*Primary Examiner* — Michael Won
(74) *Attorney, Agent, or Firm* — Lowenstein Sandler LLP

(57) ABSTRACT

Aspects of the present disclosure involve implementations that may be used to protect neural network models against adversarial attacks by obfuscating neural network operations and architecture. Obfuscation techniques include obfuscating weights and biases of neural network nodes, obfuscating activation functions used by neural networks, as well as obfuscating neural network architecture by introducing dummy operations, dummy nodes, and dummy layers into the neural networks.

20 Claims, 10 Drawing Sheets

(56) References Cited

OTHER PUBLICATIONS

Carlini, Nicholas et al., "Cryptanalytic Extraction of Neural Network Models", In: Micciancio D., Ristenpart T. (eds) Advances in Cryptology—CRYPTO 2020. CRYPTO 2020. Lecture Notes in Computer Science, vol. 12172. Springer, Cham. https://doi.org/10.1007/978-3-030-56877-1_7, International Association for Cryptologic Research 2020. 30 pages.

Dubey, Anuj et al., "MaskedNet: The First Hardware Inference Engine Aiming Power Slde-Channel Protection", Proceedings of the 2020 IEEE International Symposium on Hardware Oriented Security and Trust (HOST), May 4-7, 2020, San Jose, CA. 13 pages.

Hua, Weizhe et al., "Reverse Engineering Convolutional Neural Networks Through Side-Channel Information Leaks", DAC '18: Proceedings of the 55th Annual Design Automation Conference, Jun. 2018 https://doi.org/10.1145/3195970.3196105. 6 Pages.

Oh, Seong Joon et al., "Towards Reverse-Engineering Black-Box Neural Networks", In: Samek W., Montavon G., Vedaldi A., Hansen L., Müller KR. (eds) Explainable AI: Interpreting, Explaining and Visualizing Deep Learning. Lecture Notes in Computer Science, vol. 11700. Springer, Cham. https://doi.org/10.1007/978-3-030-28954-6_7. ICLR Feb. 14, 2018. 20 pages.

\* cited by examiner

Constant-Output Node 602    Constant-Adjusting Node 604    FIG. 6A

Pass-Through Node 610

PROTECTION OF NEURAL NETWORKS BY OBFUSCATION OF NEURAL NETWORK ARCHITECTURE

RELATED APPLICATIONS

This application claims the benefit of U.S. Provisional Application No. 63/199,364, filed Dec. 21, 2020, the entire contents of which is being incorporated herein by reference.

TECHNICAL FIELD

The disclosure pertains to neural network computing applications, more specifically to protecting neural network models against adversarial attacks.

BRIEF DESCRIPTION OF THE DRAWINGS

The present disclosure will be understood more fully from the detailed description given below and from the accompanying drawings of various implementations of the disclosure.

FIGS. 6A-E illustrate example operations of protection of neural network architecture by obfuscation using dummy operations, in accordance with one or more aspects of the present disclosure. FIG. 6A illustrates an example implementation of a constant-output node that may be used for obfuscation of neural network operations. FIG. 6B illustrates an example implementation of a pass-through node that may be used for obfuscation of neural network operations. FIG. 6C illustrates an example implementation of a pass-through cluster of nodes that may be used for obfuscation of neural network operations. FIG. 6D illustrates an example implementation of dummy (inconsequential) outputs from a node that may be used for obfuscation of neural network operations. FIG. 6E illustrates an example implementation of node clusters having cancelling outputs that may be used for obfuscation of neural network operations.

DETAILED DESCRIPTION

Figure 1:
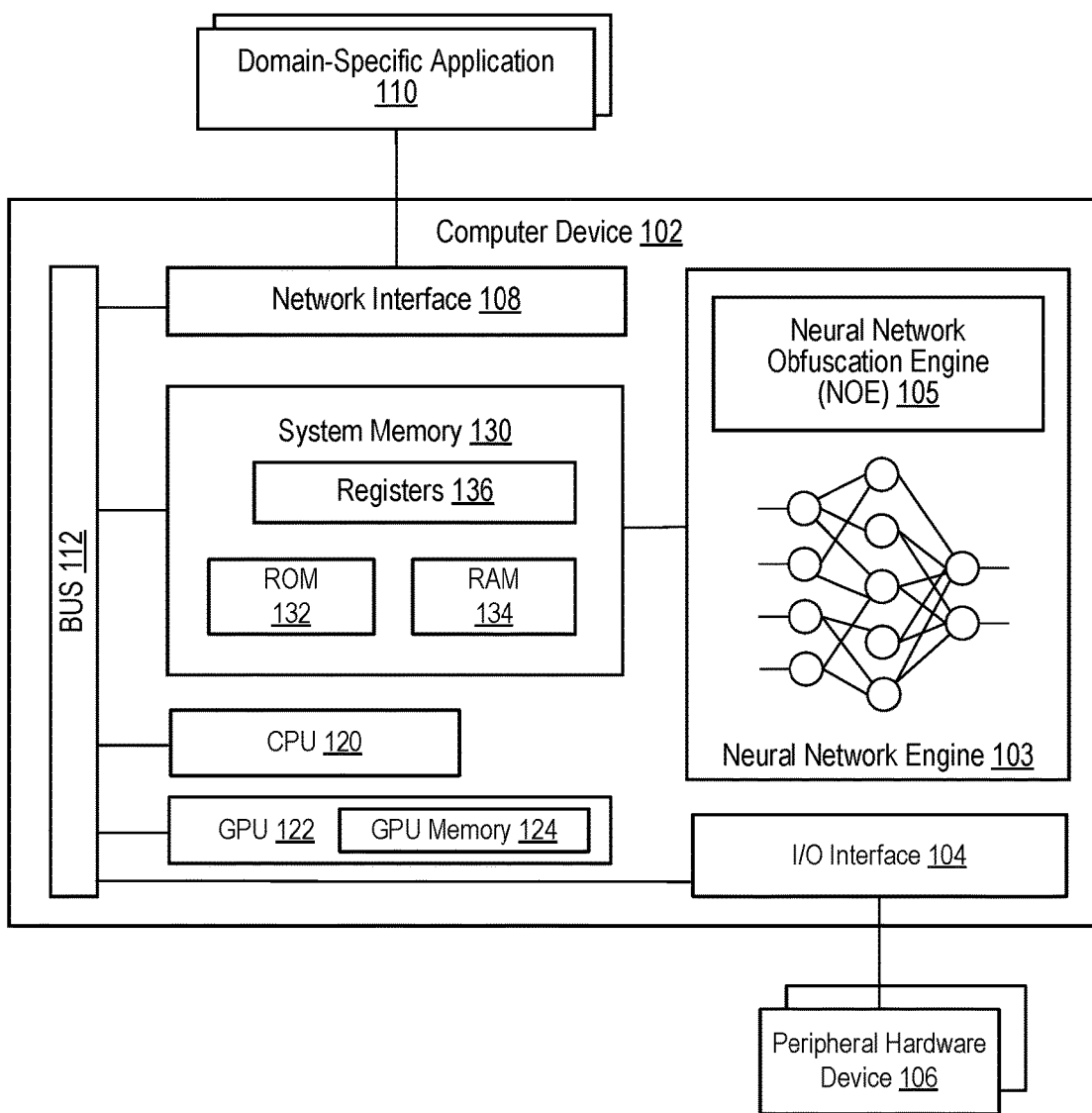
FIG. 1 illustrates an example network architecture in which various implementations of the present disclosure may operate.

Aspects of the present disclosure are directed to protection of neural networks (neural network models) against adversarial attacks and other unauthorized accesses. More specifically, aspects of the present disclosure are directed to obfuscating weights, biases, activation functions, as well as topology of neural networks and computations performed by neural networks, using a variety of obfuscation techniques.

An artificial neural network (NN) is a collection of computational operations that emulate how a biological NN operates and that may be used in a variety of applications, such as object and pattern recognition, voice recognition, text recognition, robotics, decision making, game playing, behavior modeling, and numerous other tasks. ANN often may be mapped as a graph that includes a collection of nodes and edges, where computations are performed within nodes and the data (inputs and outputs of the nodes) flows along various edges connecting the nodes. Nodes may be arranged in layers, with input layer receiving input data (e.g., a digital representation of an image) and an output layer delivering an output (e.g., image classification) of the NN. Depending on a domain-specific problem solved by the NN, any number of hidden layers may be positioned between the input layer and the output layer. Various NN architectures may include feed-forward NNs, recurrent NNs, convolutional NNs, long/short term memory NNs, Boltzmann machines, Hopfield NNs, Markov NNs, and many other types of NNs.

A node of a NN may receive a plurality of input values $\{x_i\}$ (e.g., from other nodes of the same NN or from an outside input agent, such as an image digitizing device). The node may be associated with a respective plurality of weights $\{w_i\}$ that weigh the input values and may further include a bias value b. In particular, the inputs into the node may be weighted and biased, $$z = \sum_{i=1}^{N} w_i \cdot x_i + b,$$

to produce a weighted input z for the node. The weighted input z may then be input into an activation function (AF) to obtain the output of the node $$Y = f(z).$$

The activation function may be selected from a variety of functions, such as a step function (e.g., Heaviside function), rectified linear function (which may be a leaky rectified linear function), sigmoid function, softmax function, and the like. The output value y may be provided as an input into one or more nodes of the next layer (or the same layer or, in some instances, into the same node, and so on). Each node may have its own set of weights $\{w_i\}$, bias b, and activation function $f(z)$, referred herein as node parameters. While each node may, potentially, output different values y to different nodes of the next layer (e.g., by having a first set of node parameters to generate output value $y_1$ to serve as an input into node 1 and output value $y_2$ to serve as an input into node 2), a situation of N outputs from a given node may, equivalently, be represented via N distinct nodes each having the same output into all downstream nodes to which the respective node is connected. Accordingly, for conciseness, it shall be assumed herein that a node has the same output into all its downstream nodes (however, as described in more detail below, in some implementations of the present disclosure, the output received by a single downstream node may include multiple output values y.)

Specific node parameters are determined during NN training (e.g., using training input and target outputs) and may represent a trade secret that a developer of the NN may wish to keep secret even when NN is published or is made available to a customer or another user. A user may run the NN and benefit from its output but may have no access to the actual NN parameters or NN architecture, such as the number of edges leading to/from various nodes, the number of layers, the number of nodes in each layer (including input and output layers), and so on. In some instances, an adversarial (e.g., side-channel) attack may be attempted against the NN to reveal the NN parameters and architecture. For example, a side-channel attack may be performed by monitoring emissions (signals) produced by electronic circuits (e.g. processor, memory, etc.) when the circuits are executing operations of the NN. Such signals may be electrical, acoustic, electromagnetic, optical, thermal, and so on. By recording emissions, a hardware trojan and/or malicious software may be capable of correlating specific processor (and/or memory) activity with operations carried out by the processor/memory. For example, an attacker employing a trojan may be able to detect emissions corresponding to multiple multiplication operations where different inputs are processed using the same NN parameters. As a result, by analyzing (e.g., using methods of statistical analysis) hardware emissions of the processing device, the attacker may be able to determine the values of the weights and biases, the type of AFs used, the numbers of nodes/connections/layers, and so on.

Aspects and implementations of the present disclosure address these and other problems of the existing technology by disclosing systems and methods of protecting NNs against adversarial attacks, reverse engineering of the NNs, and other unauthorized operations. More specifically, disclosed is a method of protecting NNs by obfuscating weights and biases of various nodes of a NN by expanding the number of weights and biases, e.g., by using dummy weights and biases that do not affect the ultimate output of the NN but present an attacker with a wider range of possible values to be determined, as the number of dummy weights and biases may be more (in some implementations, much more) that the number of actual weights and biases of the NN. In some implementations, dummy weights and biases may be randomly selected, thus increasing the challenges to an attacker who attempts to use an adversarial attack against the NN. Weights and biases may further be masked using various linear or reversible non-linear transformations. In some implementations, actual AFs may be masked by dummy AFs deployed for at least some of the nodes. In such implementations, a node may provide multiple output values to another node, each output computed using a different activation function. In some implementations, only one of the outputs may be the actual output of the node whereas other outputs may be dummy outputs intended to obfuscate the actual output. In some implementations, none of the outputs may be an actual output of the node. Instead, the actual output may be a certain combination of some or all of the NN's outputs (and of the underlying AFs), which combination may not be known to the attacker. Additionally, security of the NN may be further enhanced by having at least some of the nodes performing dummy operations that do not affect the actual output of the NN, but whose purpose is to make it more difficult for the attacker to focus on the actual computations and the actual data flows of the NN. Such dummy operations may include dummy computations involving real inputs and real nodes, computations involving dummy nodes, computations involving splitting of computations across multiple layers, computations involving whole dummy layers, and so on.

FIG. 1 is a block diagram illustrating an example computer system 100 in which various implementations of the present disclosure may operate. The example computer system 100 may be a desktop computer, a tablet, a smartphone, a server (local or remote), a thin/lean client, and the like. The example computer system 100 may be a system dedicated to one or more domain-specific applications 110 (e.g., object recognition application, decision-making application), and so on. The example computer system 100 may include, but not be limited to, a computer device 102 having one or more processors (e.g., capable of executing binary instructions) such as central processing units (CPUs) 120, one or more graphics processing units (GPUs) 122, and one or more system memory 130 devices. "Processor" may further refer to any device capable of executing instructions encoding arithmetic, logical, or I/O operations. In one illustrative example, a processor may follow Von Neumann architectural model and may include an arithmetic logic unit (ALU), a control unit, and a plurality of registers.

Computer device 102 may further include an input/output (I/O) interface 104 to facilitate connection of the computer device 102 to peripheral hardware devices 106 such as card readers, terminals, printers, scanners, internet-of-things devices, and the like. The computer device 102 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 102. Various hardware components of computer device 102 may be connected via a bus 112 which may have its own logic circuits, e.g., a bus interface logic unit.

Computer device 102 may support one or more domain-specific applications 110, including any application that uses neural networks. Applications 110 may be instantiated on the same computer device 102, e.g., by an operating system executed by CPU 120 and residing in the system memory 130. Alternatively, application 110 may be instantiated by a guest operating system supported by a virtual machine monitor (hypervisor) executed by the CPU 120. In some implementations, applications 110 may reside on a remote access client device or a remote server (not shown), with computer device 102 providing computational support for the client device and/or the remote server.

CPU 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more applications 110, although more than one processor core (or a logical processor) may be assigned to a single application 110 for parallel processing. A multi-core CPU 120 may simultaneously execute multiple instructions. A single-core CPU 120 may typically execute one instruction at a time (or process a single pipeline of instructions). CPU 120 may be implemented as a single integrated circuit, two or more integrated circuits, or may be a component of a multi-chip module.

GPU 122 may include multiple cores each capable of executing multiple threads (e.g., in parallel) using GPU memory 124. In some implementations, GPU 122 may execute at least some operations of NNs. For example, various GPU 122 threads may execute various operations (e.g., computation of weighed inputs and applying activation functions to the weighted inputs of the same layer NN nodes) in parallel. GPU 122 may include a scheduler (not shown) and a dispatch unit to distribute execution of computational tasks among different threads of GPU cores.

System memory 130 may refer to a volatile or non-volatile memory and may include a read-only memory (ROM) 132, a random-access memory (RAM) 134, as well as (not shown) electrically-erasable programmable read-only memory (EEPROM), flash memory, flip-flop memory, or any other device capable of storing data. The RAM 134 may be a dynamic random-access memory (DRAM), synchronous DRAM (SDRAM), a static memory, such as static random-access memory (SRAM), and the like.

System memory 130 may be used to store inputs into NNs (e.g., images received from applications 110), outputs generated by NNs (e.g., identifications of objects captured by the images and classifications of such objects), parameters of the NNs, obfuscation data, masking data, and/or any other data. System memory 130 may include one or more registers 136, which may be used to store some of the data related to execution of NNs. In some implementations, registers 136 may be implemented as part of RAM 134. In some implementations, some or all of registers 136 may be implemented separately from RAM 134. Some or all registers 136 may be implemented as part of the hardware registers of CPU 120. Some inputs or outputs of nodes of NNs and/or intermediate values (e.g., weighted inputs) may be stored in GPU memory 124.

Computer device 102 may include a neural network engine 103 to execute one or more NNs. NN engine 103 may be located within system memory 130 or in a separate memory device. NN engine 103 may further include a neural network obfuscation engine (NOE) 105 to implement obfuscation of NN parameters, topology, and operations, as described in the present disclosure. NOE 105 may be implemented in software and/or hardware, firmware, or in any combination thereof.

Figure 2A:
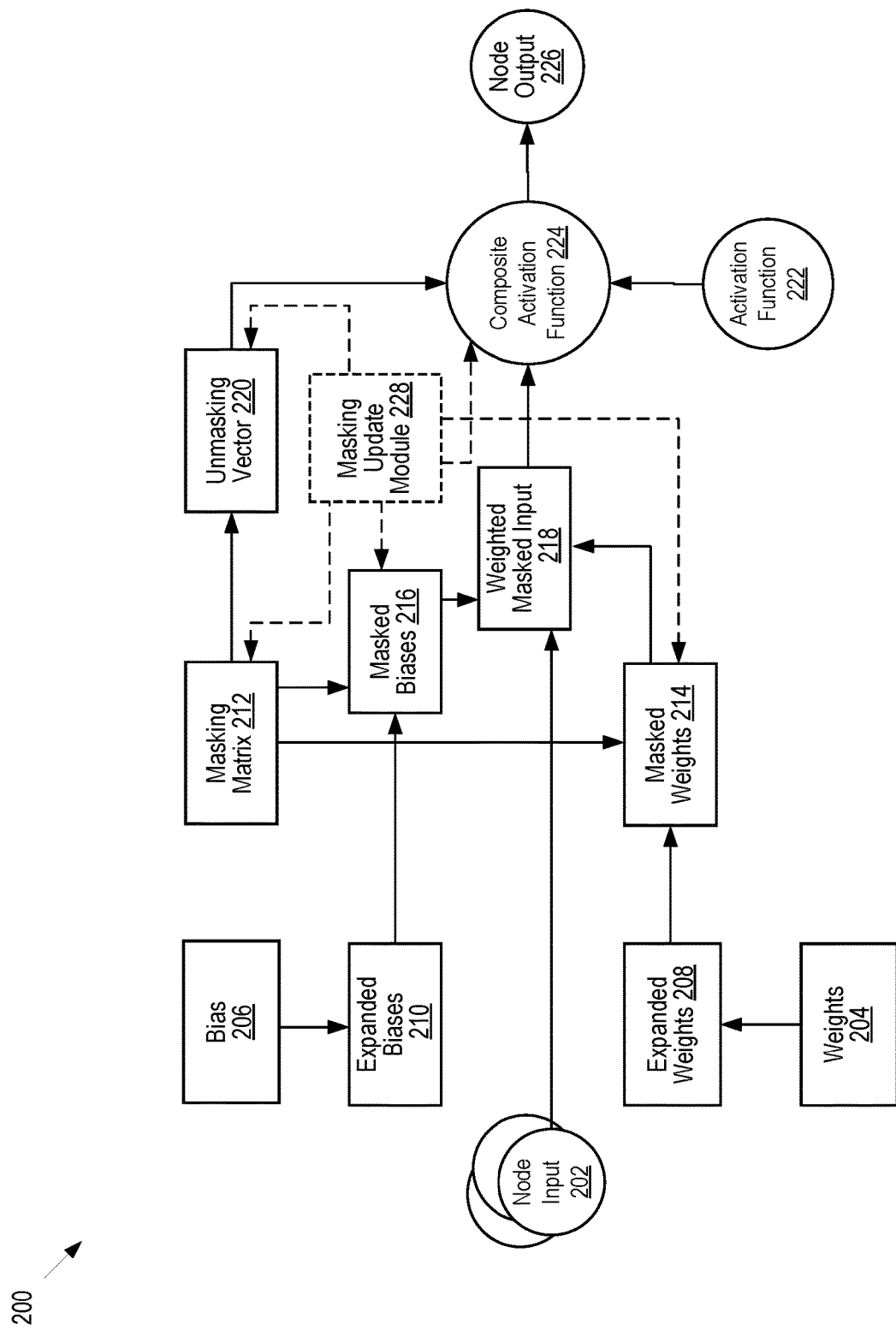
FIG. 2A illustrates example operations of protection of neural network operations using weight and bias obfuscation, in accordance with one or more aspects of the present disclosure.
Figure 2B:
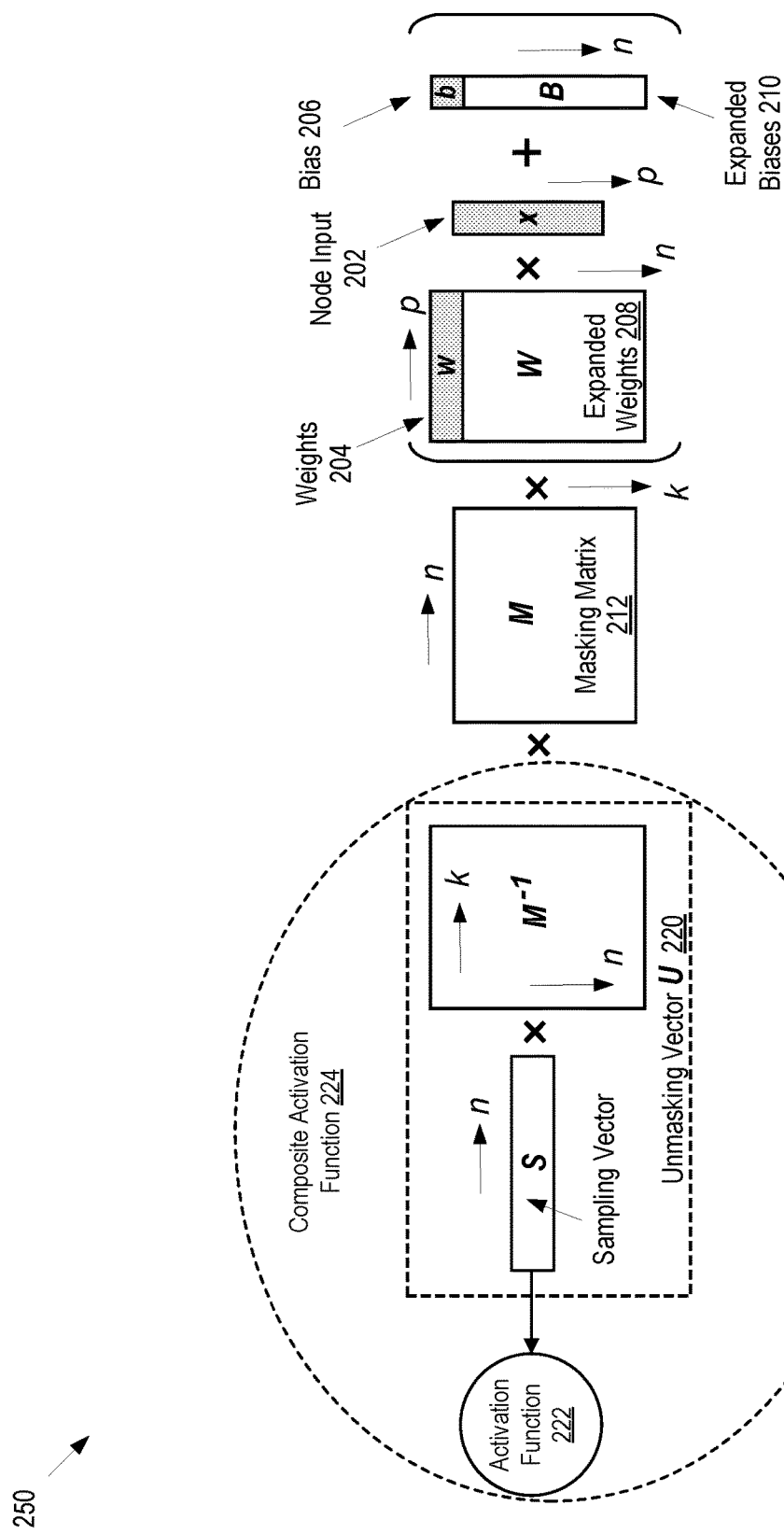
FIG. 2B depicts schematically matrix operations that may be performed as part of example operations of FIG. 2A, in accordance with one or more aspects of the present disclosure.

FIG. 2A illustrates example operations 200 of protection of neural network operations using weight and bias obfuscation, in accordance with one or more aspects of the present disclosure. Example operations 200 may be implemented by NN engine 103 in conjunction with NN obfuscation engine 105. Example operations 200 are illustrated for a single node of a NN being used, but similar operations may be performed for any number (or all) nodes of the NN. FIG. 2B depicts schematically matrix operations 250 that may be performed as part of example operations 200 of FIG. 2A, in accordance with one or more aspects of the present disclosure.

A node input 202 may include p input values $\{x_i\}$ henceforth denoted as a row vector $\vec{x}=(x_1, \ldots, x_p)$. Stored weights 204 $\{w_i\}$, similarly combined into a vector $\vec{w}=(w_1, \ldots, w_p)$, together with stored bias 206 $b$ may determine the target output $y=f(\vec{w} \cdot \vec{x}^T + b)$ of the node. To obfuscate operations leading to the output y, NOE 105 may generate n−1 additional (dummy) weight vectors and expand (block 208) the weight vector $\vec{w}$ into an n×p weight matrix $$\vec{w} \rightarrow \hat{W}, \hat{W}=[\vec{w}_1, \ldots, \vec{w}_n],$$

where, in one implementation, one of the vectors $\vec{w}_j$ may be the vector $\vec{w}$ of the actual inputs whereas other vectors may be dummy weight vectors containing obfuscation weights. For the sake of specificity only, in some illustrations it may be assumed that vector $\vec{w}_1$ may be vector $\vec{w}$ of the actual weights while other vectors $\vec{w}_{j \neq 1}$ are dummy weight vectors.

Furthermore, NOE 105 may generate n−1 additional (dummy) biases to expand (block 210) bias b into an n-component bias vector $$b \rightarrow \vec{B}, \vec{B}=(b_1, \ldots, b_n),$$

where, in one implementation, one of the components $b_j$ may be the actual bias b whereas other components may be dummy biases. For the sake of specificity only, in some illustrations, it may be assumed that the component $b_1$ of the vector may be the actual bias b while other biases $b_{j \neq 1}$ are dummy biases. Dummy weights and dummy biases may be generated randomly, chosen from a previously prepared list of values (which may be periodically updated), or selected in any other manner.

Using expanded weights and biases, the weighted input z into the node may be computed by first computing the n-component column vector $\hat{W} \cdot \vec{x}^T + \vec{B}^T$, and then selecting an appropriate component for the weighted input z. For example, in an illustration where real weights and biases correspond to the first row of matrix $\hat{W}$ and the first component of vector $\vec{B}$, respectively, the first component of vector $\hat{W} \cdot \vec{x}^T + \vec{B}^T$ yields the actual weighted input into the activation function of the node (whereas other components of the vector obfuscate the actual weighted input).

In some implementations, prior to computing the vector of weighted inputs, NOE 105 may perform additional masking of the weights and biases. In the following description, the concept of masking is first illustrated using linear masking examples, but it should be understood (see also a discussion below) that any non-linear masking in which unmasked values can be recovered from their masked values may also be used. In one example implementation, masking may be performed using a masking matrix $\hat{M}$ (block 212), which may be a k×n matrix, with k that may be different from p and/or n. Specifically, masking matrix $\hat{M}$ may be used to mask the expanded weights by determining (at block 214) the matrix product $\hat{W}_M = \hat{M} \cdot \hat{W}$ to obtain a k×n matrix of masked weights $\hat{W}_M$. Similarly, NOE 105 may perform additional masking of expanded biases by determining (at block 216) a k-component vector of masked biases $\vec{B}_M^T = \hat{M} \cdot \vec{B}^T$. The weighted masked input vector 218 (likewise, a k-component vector) may now be computed as the sum:

$$\vec{Z}_M = \hat{W}_M \vec{x}^T + \vec{B}_M^T.$$

To obtain a correct weighted input z into the activation function of the node (to obtain the node output y=f(z)), the masked input may be processed using an unmasking vector $\vec{U}$, e.g., $z = \vec{U} \cdot \vec{Z}_M$. The unmasking vector (block 220) may be determined based on the inverse matrix $\hat{M}^{-1}$. For example, in an illustration where real weights and biases correspond to the first row of matrix $\hat{W}$ and the first component of vector $\vec{B}$, respectively, the unmasking vector may be determined as $$\vec{U} = (1, 0, \ldots, 0) \cdot \hat{M}^{-1},$$

Where the n-component sampling vector $\vec{S}=(1, 0, \ldots, 0)$ extracts the first row of the n×k inverse masking matrix $\hat{M}^{-1}$.

To avoid performing unmasking operation (multiplication by $\vec{U}$) after computing the weighted masked input 218 (and thus exposing the weighted input z to a potential attacker), the unmasking operation may be combined with computation of the activation function $f(z)$ 222. More specifically, instead of computing the node output value 226 by applying the activation function $f(z)$ to the unmasked weighted input $$y=f(z)=f(\vec{U}\cdot\vec{Z}_M),$$

NOE 105 may first determine (block 224) a composite activation function $f \circ \vec{U}$ that operates on the weighted masked input $\vec{Z}_M$ directly and produces the same result as the activation function $f$ acting on the unmasked weighted input z:

$$(f \circ \vec{U})(\vec{Z}_M)=f(\vec{U}\cdot\vec{Z}_M).$$

As a result, composite activation function 224 (f∘Ū), determined based on activation function 222 (f) and unmasking vector 220 ($\vec{U}$), and being applied to weighted masked input 218 ($\vec{Z}_M$), generates the correct output value 226 (y).

In various implementations, any non-linear masking (in which information about the actual weights and biases is not lost) may be used instead of linear masking. For example, expanded weight matrix $\hat{W}$ may be nonlinearly masked using a first (non-linear) masking transformation, such that an element $(\hat{W}_M)_{ij}$ of the masked weight matrix $\hat{W}_M$ is a function of one or more (or even all) elements of the expanded weight matrix $\hat{W}$: $(\hat{W}_M)_{ij}=F_{ij}(\hat{W})$. The first transformation $F_{ij}$ may be reversible, in a sense that there may exist an inverse (unmasking) transformation that determines an element $\hat{W}_{ij}$ based on of one or more elements of the masked weight matrix $\hat{W}_M$: $\hat{W}_{ij}=F^{-1}_{ij}(\hat{W}_M)$. Similarly, expanded bias vector $\vec{B}$ may be nonlinearly masked using a second transformation, such that an element $(\vec{B}_M)_i$ of the masked bias vector $\vec{B}_M$ is a function of one or more (or even all) elements of the expanded bias vector $\vec{B}$: $(\vec{B}_M)_i=G_i(\vec{B})$. The second transformation $G_i$ may also be reversible, in a sense that there may exist an inverse (unmasking) transformation that determines an element $(\vec{B})_i$ based on of one or more elements of the masked bias vector $\vec{B}_M$: $(\vec{B})_i=G^{-1}_i(\vec{B}_M)$. The masked weight matrix $\hat{W}_M$ and the masked bias vector $\vec{B}_M$ may be used to compute the masked weighted inputs. An activation function $f(z)$ may be composed with the first masking transformation $F^{-1}$ and the second masking transformation $G^{-1}$, and may further be composed with the sampling vector $\vec{S}$ to extract correct elements of the masked weighted inputs. The composed activation function may act directly on the masked weighted inputs without unmasking actual weighted inputs, substantially as described in relation to linear masking.

Periodically, masking update module 228 of NOE 105 may update (as depicted schematically with dashed arrows) masking matrix 212 ($\hat{M}$), weight masking 214 ($\hat{W}_M$), bias masking 216 ($\vec{B}_M$), unmasking vector 220 ($\vec{U}$), and composite activation function 224 (f∘Ū) without unmasking the weights, biases or activation function. Masking update may be performed for every instance of a NN execution, after a certain number of NN executions is performed, after a certain time has passed, and so on. In some implementations, updated weights $\hat{W}_M'$ and biases $\vec{B}_M'$ may be obtained by generating a new k×n masking matrix and computing masked weights $\hat{W}_M'=\hat{M}'\cdot\hat{W}$ and biases $\vec{B}_M'^T=\hat{M}'\cdot\vec{B}^T$ using expanded weights $\hat{W}$ and expanded biases $\vec{B}^T$ that include actual weights $\vec{w}$, and actual bias b. In some implementations, to protect weights and biases from added exposure to adversarial attacks, updated weights and biases may be determined sequentially, based on previous (e.g. most recent) weights and biases, by using a square k×k masking matrix $\hat{M}'$, as follows, $$\hat{W}'_M=\hat{M}'\cdot\hat{W}_M=\hat{M}'\cdot\hat{M}\cdot\hat{W}, \vec{B}_M'^T=\hat{M}'\cdot\vec{B}_M^T=\hat{M}'\cdot\hat{M}\cdot\vec{B}^T.$$

The updated composite activation function, (f∘Ū)∘Ū', may similarly be obtained based on a recent (e.g., the most recent) activation function, f∘Ū. In some implementations, matrix $\hat{M}'$ need not be a square matrix, but may be a rectangular k'×k matrix, so that the number of elements in $\hat{W}_M'$ and biases $\vec{B}_M'$ is different than the number of elements in $\hat{W}_M$ and biases $\vec{B}_M$, for additional protection. Nonlinear masking operations can also be updated in a similar manner.

In some implementations, the weighted inputs may additionally be masked (e.g., multiplicatively and/or additively) before the weighted inputs are input into the node's activation function. Even though the obfuscation implementations described in relation to FIGS. 2A and 2B involve linear transformations, in some implementations non-linear obfuscation and masking may be used. For example, an invertible non-linear transformation may be used instead of masking matrix $\hat{M}$, with the inverse of the non-linear transformation composed with the activation function acting on the output of the non-linear transformation.

As a result of the obfuscation operations disclosed above (or other similar operations), the weighted input into the node's activation function may be multiplicatively (with mask $m_1$) and additively (with mask $m_2$) masked compared with the target weighted input:

$$z \to z^*=m_1 \cdot z+m_2.$$

Corresponding obfuscation operations for various activation functions are illustrated below. It should be understood that the list of activation functions that may be used in various implementations consistent with the present disclosure is practically unlimited and that activation functions described below are intended as illustrations only.

In some implementations, the Heaviside function $\Theta(z)$ (step function) may be used as the activation function, $y=\Theta(m_1 \cdot z+m_2)$. In such implementations, masking obfuscates the point $z=-m_2/m_1$ which separates the input values z for which the output is zero ($z<m_2/m_1$) from the input values for which the output is non-zero ($z<-m_2/m_1$). Because the masked output $y_M=\Theta(m_1 \cdot z+m_2)=\Theta(z+m_2/m_1)$ is different from the correct output $y=\Theta(z)$, an additional adjustment operation may subsequently be performed to determine the correct output $y_M \to y$, e.g., using $y=y_M \to y-\text{sign}(m_2/m_1)\cdot\Theta(-z(z+m_2/m_1))$. Such an unmasking operation may be performed as part of computations associated with the next (downstream) node (or multiple nodes), into which the masked output value $y_M$ is provided. To prevent an attacker from identifying the location of the point $(-m_2/m_1)$ where the output values become non-zero, NOE 105 may use additional techniques, such as shifting the step function into a same-sign domain (e.g., positive or negative) of the output values. For example, NOE 105 may select additional masks, e.g., $m_3$ and $m_4$, to determine outputs that are positive (or negative) for both positive and negative inputs z, for example: $y_M = m_3 \cdot \Theta(m_1 \cdot z + m_2) + m_4 \cdot \Theta(-m_1 \cdot z - m_2)$. In some implementations, an order of evaluation of the conditions for the sign of the argument of the step functions may be randomized. For example, during evaluation of the step function, NOE 105 may randomly choose to evaluate which condition takes place, $m_1 \cdot z + m_2 > 0$ or $m_1 \cdot z + m_2 < 0$, to further obfuscate where the location of the point $-m_2/m_1$ actually is. Adjustment for masks $m_3$ and $m_4$ may then be done (e.g., at the next node(s)) similarly to how adjustment for masks $m_1$ and $m_2$ may be performed. In some implementations, all masks $m_1$, $m_2$, $m_3$ and $m_4$ may be deployed. In some implementations, any of the masks $m_1$, $m_2$, $m_3$ and $m_4$ may be omitted. Similar techniques may be used to obfuscate a point of discontinuity of an activation function that is not a step function but some other discontinuous function.

In some implementations, an activation function may be a rectified linear function (with or without a leak) that has a knee at some input value, which will be set to zero for the sake of conciseness (although a generalization to the knee located at arbitrary value of z is possible), e.g., $y = \alpha \cdot z \cdot \Theta(z) + \beta \cdot z \cdot \Theta(-z)$. When a masked value, e.g., $z_M = z + m_1$, is input into such an activation function, NOE 105 may generate an additional mask $m_2$ and compute sums and differences of the two masks $m_\pm = m_2 \pm m_1$ and then compute two additional input values:

$$z_+ = z_M + m_- = z + m_2; z_- = z_M - m_+ = z - m_2.$$

Subsequently, NOE 105 may compare the values of $z_+$ and $z_-$ to identify the sign of the actual input value z without unmasking z. For example, if a positive mask $m_2$ is selected and it is determined that $|z_+| > |z_-|$, NOE 105 may identify that $z > 0$ and apply the positive part ($\alpha$-part) of the activation function: $y_M = \alpha \cdot z_M$. The adjustment for the mask $m_1$ may then be performed as part of the next node's computations, e.g., $y = y_M - \alpha \cdot m_1$. Alternatively, the adjustment for the mask $m_1$ may performed, e.g., by adjusting weights and biases of that next node to compensate for the extra value $\alpha \cdot m_1$ contained in $y_M$. Similarly, if a positive mask $m_2$ is selected and it is determined that $|z_+| < |z_-|$, NOE 105 may identify that $z < 0$ and apply the negative part ($\beta$-part) of the activation function: $y_M = \beta \cdot z_M$. The adjustment for the mask $m_1$ may be performed as part of the next node's computations, e.g., $y = y_M - \beta \cdot m_1$, or, alternatively, the adjustment for the mask $m_1$ may be performed by adjusting weights and biases of that next node to compensate for the extra value $m_1$ contained in $y_M$. Similar techniques may be used to obfuscate a point of discontinuity of an activation function that is not a rectified linear function but some other function that has a discontinuous derivative.

Additional obfuscation may be achieved by masking (rescaling) the slopes a and shifting the location of the knee from z=0 to a different point, and the like. Such additional obfuscation may be performed similarly to rescaling and shifting described above in relation to the Heaviside function.

In some implementations, a rectified linear activation function may be used that has $\beta = 0$ and $\alpha = 1$ (by deploying rescaling, a may also be given any other value): $f(x) = \text{relu}(x) = (x + |x|)/2$. In some implementations, an input z into the rectified linear function may be a sum of the masked weighted input $z_m$ and a masking value m: $y = \text{relu}(z_m + m)$. The actual input $z = z_m + m$ may further be masked with a product of two additional masks, $m_1$ and $m_2$, using the following masking procedure:

$$|m_1 \cdot m_2| \cdot \text{relu}(z_m + m) = \tfrac{1}{2} \cdot |m_1| \cdot (|m_2| \cdot z_m + |m_2| \cdot m) + \tfrac{1}{2} \cdot |m_1 \cdot m_2 \cdot z_m + m_1 \cdot m_2 \cdot m|$$

Consequently, $\text{relu}(z_m + m)$ is masked by $m_1$ and $m_2$ without separately revealing the value $z = z_m + m$. To further mask where the knee of the function $\text{relu}(z_m + m)$ is located, NOE 105 may introduce additional masking knees during computation of the masked value $|m_1 \cdot m_2| \text{relu}(z_m + m)$. In particular, since $z \equiv \text{relu}(z) - \text{relu}(-z)$ (or more generally, $z \equiv \text{relu}(z-a) - \text{relu}(-z+a) + a$), a masking knee at some (e.g., randomly chosen) point $z = a$ may be introduced, e.g., the rectified linear function may be computed alternatively, as follows, $$|m_1 \cdot m_2| \cdot \text{relu}(z_m + m) = \tfrac{1}{2} \cdot |m_1| \cdot (|m_2|\text{relu}(z_m + a) + |m_2| \cdot m) + \tfrac{1}{2} \cdot |m_1 \cdot m_2 \cdot z + m_1 \cdot m_2 \cdot m| - \tfrac{1}{2} \cdot |m_1| \cdot (|m_2|\text{relu}(-z_m - a) - |m_2| \cdot m),$$

where the masking knee at $z_m = -a$ is introduced in a way that obfuscates intermediate computations but does not affect the ultimate result. Additional masking knees may be introduced in a similar manner, up to a target number of knees.

In some implementations, where activation function 222 is a linear function, an unmasking operation (e.g., multiplication by vector $\vec{U}$ prior) may commute with an application of the activation function: $f(\vec{U} \cdot \vec{Z}_M) = \vec{U} \cdot f(\vec{Z}_M)$. Accordingly, activation function $f$ may be applied directly to weighted masked input $\vec{Z}_M$ while the unmasking operation (e.g., composite with the application of weights and biases) may be applied during computations of the next node. In some implementations, additional masking may be performed by a partial reduction of weighted masked input $\vec{Z}_M$ (which is an n-component vector) to an m-component vector. More specifically, in addition to the unmasking vector (which unmasks and selects a correct weighted output value z from $\vec{Z}_M$), $$\vec{U} = (1,0,0,0,0, \ldots ,0,0) \cdot \hat{M}^{-1},$$

another vector $\vec{U}'$ may be defined such that, when applied to vector of weighted inputs $\vec{Z}_M$, it selects and sums various specific (e.g., randomly selected, in number and position) elements of the vector of the weighted inputs $\vec{Z}_M$:

$$\vec{U}' = (0,1,1,0,0, \ldots ,0,1) \cdot \hat{M}^{-1},$$

For example, the row vector $\vec{U}'$ illustrated here selects and adds together the second, the third, and the last components (for a total of n−1 components) of vector $\hat{M}^{-1} \cdot \vec{Z}_M$. A linear activation function applied to the partially reduced weighted masked input $\vec{Z}_M$ may now be represented as, $$f((\vec{U} + \vec{U}') \cdot \vec{Z}_M) = f(\vec{U} \cdot \vec{Z}_M + \vec{U}' \cdot \vec{Z}_M) = f(\vec{U} \cdot \vec{Z}_M) + f(\vec{U}' \cdot \vec{Z}_M) = \vec{U} \cdot f(\vec{Z}_M) + \vec{U}' f(\vec{Z}_M),$$

where the term $\vec{U} \cdot f(\vec{Z}_M)$ represents an actual output of the node and the term $\vec{U}' f(\vec{Z}_M)$ corresponds to a masking data. Accordingly, in one implementation, NOE 105 may input the total value $(\vec{U} + \vec{U}') \cdot \vec{Z}_M$ to the activation function and subtract the masking value $\vec{U}' f(\vec{Z}_M)$ to determine the actual output of the node:

$$y = \vec{U} \cdot f(\vec{Z}_M) = f((\vec{U} + \vec{U}') \cdot \vec{Z}_M) - \vec{U}' \cdot f(\vec{Z}_M).$$

In some implementations, subtraction of the masking value $\vec{U} \cdot f(\vec{Z}_M)$ may be performed as part of the next node's computations (e.g., by using inputs and weights composite with the masking value).

In some implementations, the sigmoid function may be used as an activation function. To determine the output value of the sigmoid function $y=S(z)=[1+\exp(-z)]^{-1}$, based on the masked input $z+m_1$ without unmasking the actual input z, the following procedure may be implemented. An additional (optional) masking value $m_2$ may be selected (e.g., randomly or from an existing list, which may be periodically updated) and the exponential values may be computed:

$$f_1(z)=\exp(z+m_1+m_2), f_2(z)=\exp(z+m_1), f_3=\exp(m_1).$$

Using the computed values, the output value may be determined as $$y_M = \frac{f_1(z)}{f_2(z)+f_3} = \frac{\exp(z+m_1+m_2)}{\exp(z+m_1)+\exp(m_1)} = y \cdot \exp(m_2).$$

Therefore, the output value $y_M$ (multiplicatively masked by $\exp(m_2)$) is determined without revealing the actual input z (which is handled in combination $z+m_1$). Unmasking of the actual output y may then be performed using multiplication of $y_M$ by $\exp(-m_2)$. Alternatively, adjustment for the masking may be performed as part of the next node's computations (e.g., using inputs and weights composite with the unmasking value $\exp(-m_2)$).

Similarly, masking of the softmax activation function, $$y = \text{softmax}(z_1, z_2) = \frac{\exp(z_1)}{\exp(z_1)+\exp(z_2)},$$

may be performed by computing $$y_M = \frac{\exp(z_1+m_1+m_3)+\exp(z_1+m_2+m_3)+\exp(z_2+m_2+m_3)}{\exp(z_1+m_3)+\exp(z_2+m_3)} = y \cdot \exp(m_1) + \exp(m_2).$$

As in the case of the sigmoid function, the output value $y_M$ (multiplicatively masked by $\exp(m_1)$ and additively coupled by $\exp(m_2)$) is determined without revealing the inputs $z_1$ and $z_2$ (which are handled in respective combinations $z_1+m_3$ and $z_2+m_3$). Unmasking of the actual output y may be performed by using $y=y_M \cdot \exp(-m_1)-\exp(m_2-m_1)$), separately or in composition with computations of the next node(s).

Figure 3A:
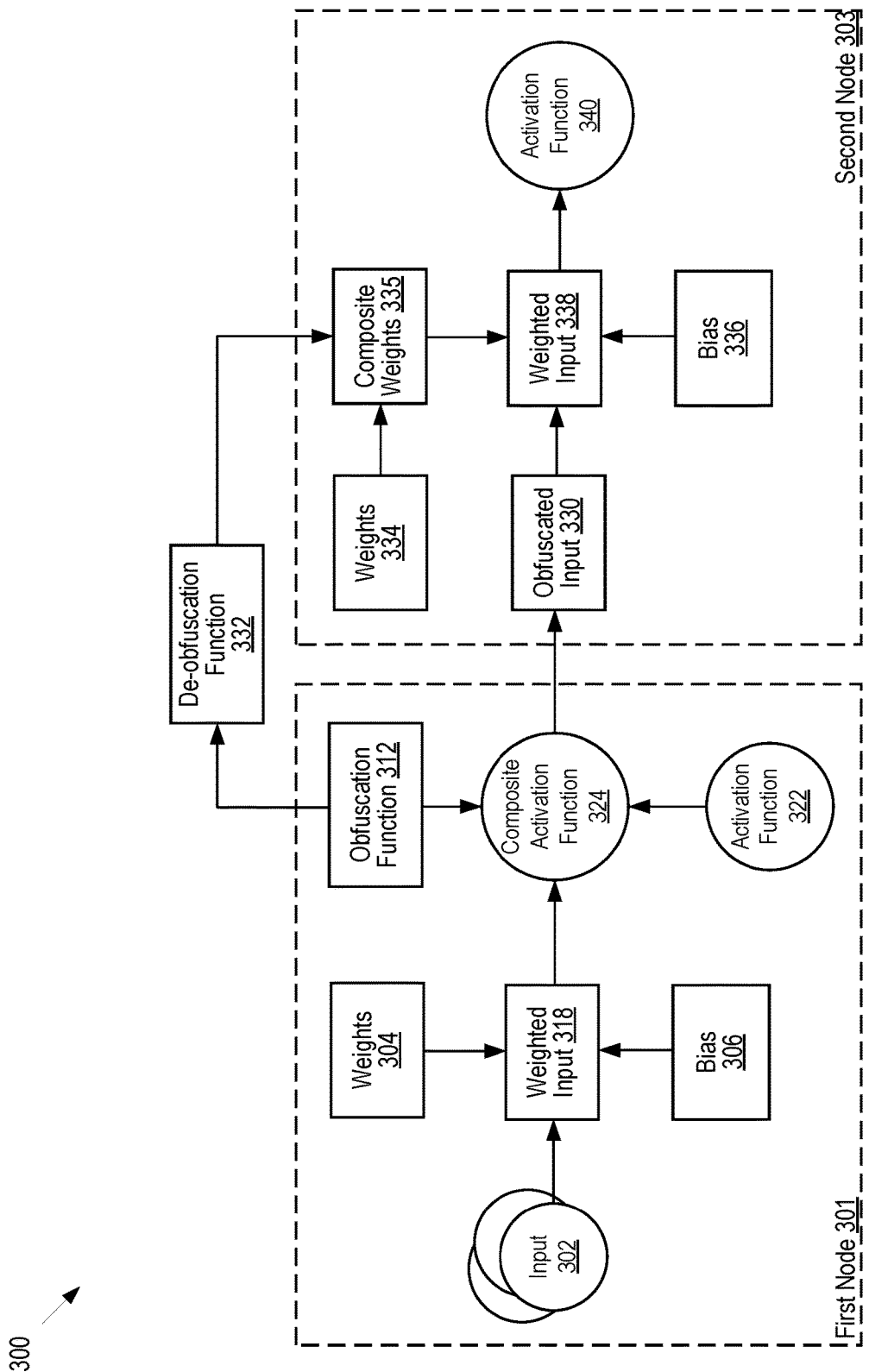
FIG. 3A illustrates example operations of protection of a neural network by obfuscating an activation function of a neural network node, in accordance with one or more aspects of the present disclosure.

FIG. 3A illustrates example operations 300 of protection of a neural network by obfuscating an activation function of a neural network node, in accordance with one or more aspects of the present disclosure. Example operations 300 may be implemented by NN engine 103 in conjunction with NN obfuscation engine 105. Example operations 300 are illustrated for a pair of nodes of a NN, e.g., a first node 301 and a second node 303. Although operations 300 are shown, for conciseness, as being performed without obfuscation of weights and biases, it should be understood that operations 300 may also be combined with such obfuscation operations (e.g., as disclosed above in relation to FIGS. 2A and 2B).

As shown in FIG. 3A, a first node input 302, e.g., a row vector $\vec{x}=(x_1, \ldots, x_p)$, may be weighted using weights 304, e.g., $\vec{w}=(w_1, \ldots, w_p)$, and biased with bias 306, e.g., b, to determine a weighted input 318, e.g., $z=\vec{w} \cdot \vec{x}^T+b$. Under normal (without obfuscation) node operations, weighted input 318 may be provided to activation function $f(z)$ to generate a node output $y=f(\vec{w} \cdot \vec{x}^T+b)$ of the node. In some implementations, such normal operations may be modified to protect against adversarial attacks. More specifically, operations 300 may include obfuscation of activation function 322 to protect the nature (e.g., type) and specific form (e.g., parameters of the activation function) using an obfuscation function 312, which may be randomly generated by NOE 105, selected from a database of obfuscation functions, and so on. Obfuscation function 312, e.g., $s=g(f)$, may be an invertible function (such that there exists a unique value $f=g^{-1}(s)$ for a range of inputs f that may be output by activation function 322). Obfuscation function 312 may be applied to the node output y and may produce obfuscated output $O=g(f(z))$. In order to obfuscate activation function $f(z)$ 322, NOE 105 may compute the obfuscated output O without revealing $f(z)$. In particular, NOE 105 may obtain a composite activation function $g \circ f$ 324 that applies to the weighted input 318 directly, $$O=g(f(z))=(g \circ f)(z),$$

computing the obfuscated output O without performing the intermediate step of computing $f(z)$. In one non-limiting example, activation function 322 may be a sigmoid function $f(z)=[1+\exp(-z)]^{-1}$. NOE 105 may obfuscate activation function 322 by selecting the natural logarithm obfuscation function 312, $g(f)=\ln f$. The composite activation function 324 may, therefore, be first selected as $g \circ f(z)=z-\ln[\exp(z)+1]$.

The obfuscated output O may then be provided (or made available) to second node 303 as (obfuscated) input 330. Additionally, a de-obfuscation function 332 may be provided to second node 303. De-obfuscation function 332 may be an inverse $f=g^{-1}(s)$ to obfuscation function 312 $s=g(f)$. For example, if obfuscation function 312 is selected to be $g(f)=\exp(f)-1$, de-obfuscation function 332 may be $g^{-1}(s)=\ln(1+s)$.

De-obfuscation function 332 may be used to identify an actual output value y of first node 301 without revealing the output value y. For example, a respective weight w (to weigh the input from first node 301) of the weights 334 of second node 303 may be combined with de-obfuscation function 332 to form a respective composite weight, e.g., $w'=w \ g^{-1}$, of the composite weights 335 of second node 303. In some implementations, all inputs (e.g., from all upstream nodes) into second node 303 may similarly be obfuscated with respective obfuscation functions 312 and de-obfuscated using respective de-obfuscation functions 332, e.g., by forming respective composite weights for each of the (upstream) nodes that provide inputs into second node 303. Composite weights 335, together with bias 336 may then be used to obtain a weighed input 338 into an activation function 340 of second node 303. Composite weights 335 and bias 336 may further be masked using implementations described in relation to FIGS. 2A and 2B.

Figure 3B:
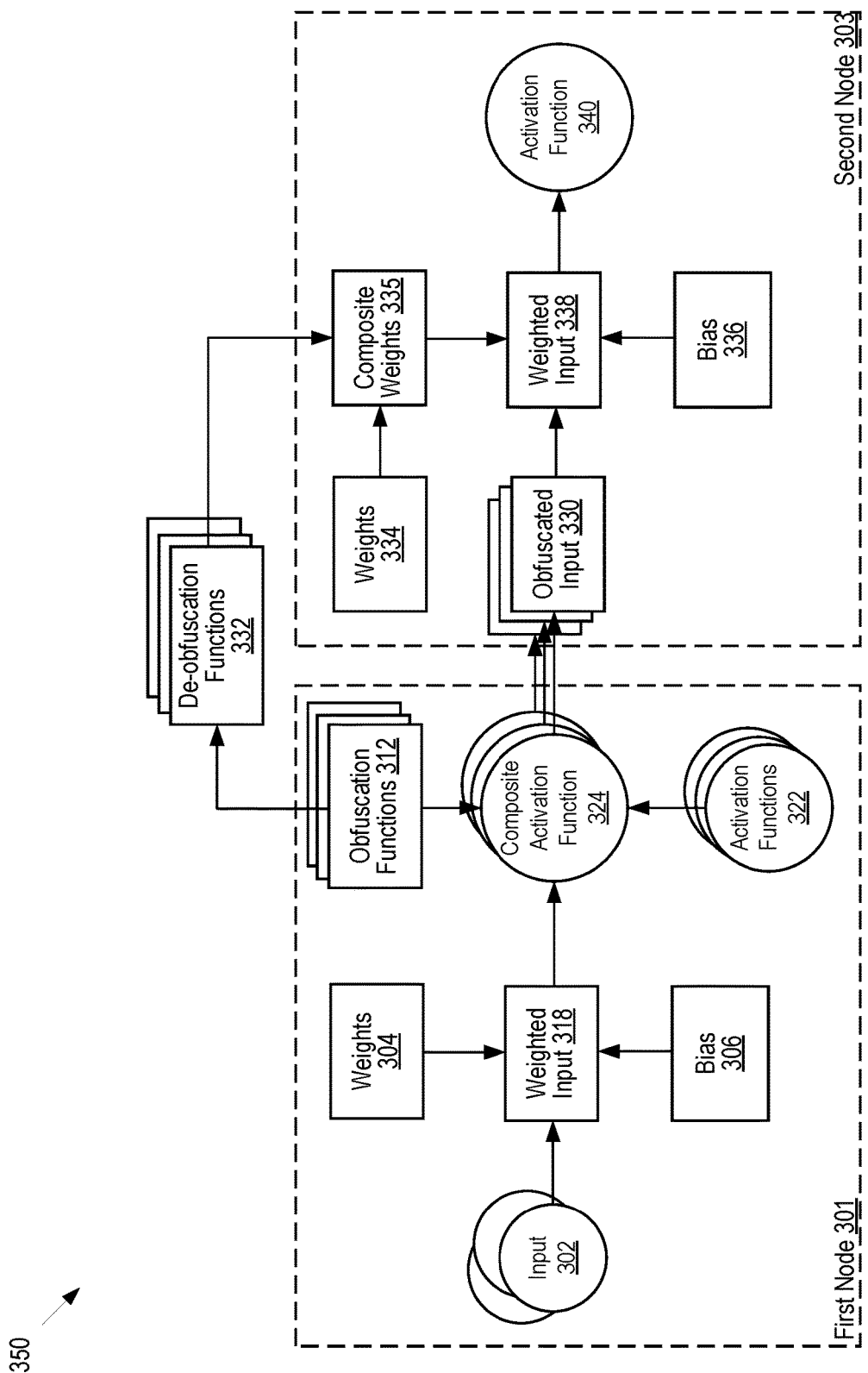
FIG. 3B illustrates example operations of protection of a neural network by using multiple obfuscating activation functions of a neural network node, in accordance with one or more aspects of the present disclosure.

FIG. 3B illustrates example operations 350 of protection of a neural network by using multiple obfuscating activation functions of a neural network node, in accordance with one or more aspects of the present disclosure. Example operations 350 may be implemented by NN engine 103 in conjunction with NN obfuscation engine 105. Example operations 350 may further protect the neural network by generating multiple activation functions 322, such as $f_1(z)$, $f_2(z), \ldots$, to obfuscate the actual activation function $f(z)$ of first node 301. Each activation function $f_j(z)$ may also be obfuscated with a respective obfuscation function 312, e.g., $g_j(f)$, which may be an invertible function. Multiple obfuscation functions 312 may be applied to the node output y and may produce multiple obfuscated outputs $O_j = g_j(f_j(z))$. NOE 105 may compute the obfuscated outputs $O_j$ without revealing $f_j(z)$. In particular, NOE 105 may obtain multiple composite activation functions $g_j \circ f_j$ 324 that apply to the weighted input 318 directly, $$O_j = (g_j \circ f_j)(z),$$

and compute the obfuscated output $O_j$ without performing intermediate steps of computing $f_j(z)$.

The obfuscated output $O_j$ may then be provided to second node 303 as a vector obfuscated input 330, e.g. $\vec{O} = (O_1, O_2, \ldots)$. (In some implementations, each upstream node that provides inputs into second node 303 may provide its own vector of obfuscated inputs 330, each vector having a number of components that may be different from a number of components provided by other upstream nodes.) Additionally, to obfuscate which of the activation functions $f_1(z)$, $f_2(z), \ldots$, is an actual activation function and which functions are dummy functions, NOE 105 may perform mixing of outputs among the output components $O_j$.

As a non-limiting example intended only to illustrate such a mixing of outputs, activation function $f_1(z)$ may be the actual activation function whereas activation functions $f_2(z)$ and $f_3(z)$ may be dummy activation functions. Each activation function may be obfuscated with a respective obfuscation function $g_1$, $g_2$, or $g_3$, as disclosed above. For conciseness of notations, such an obfuscation is henceforth implied but not stated explicitly. A masking matrix $\hat{M}$ may be constructed that transforms a vector of activation functions $\vec{f} = (f_1, f_2, \ldots)$ into a vector of output values: $\vec{O} = \hat{M} \cdot \vec{f}$. For example, a masking matrix $$\hat{M} = \begin{pmatrix} m_1 & m_2 & m_3 \\ 0 & m_4 & 0 \\ 0 & 0 & m_5 \end{pmatrix}$$

generates the following vector of output values: $O_1 = m_1 f_1 + m_2 f_2 + m_3 f_3$, $O_2 = m_2 f_2$, $O_3 = m_3 f_3$. Correspondingly, the following unmasking vector $$\vec{U} = \left( \frac{1}{m_1}, -\frac{m_2}{m_1 m_4}, -\frac{m_3}{m_1 m_5} \right)$$

may be used to unmask the correct activation function using the vector of output values, $\vec{U} \cdot \vec{O} = f_1(z) \equiv y$. The unmasking of the actual output y may be performed in composition with computations of the composite weights 335 of second node 303.

Figure 4:
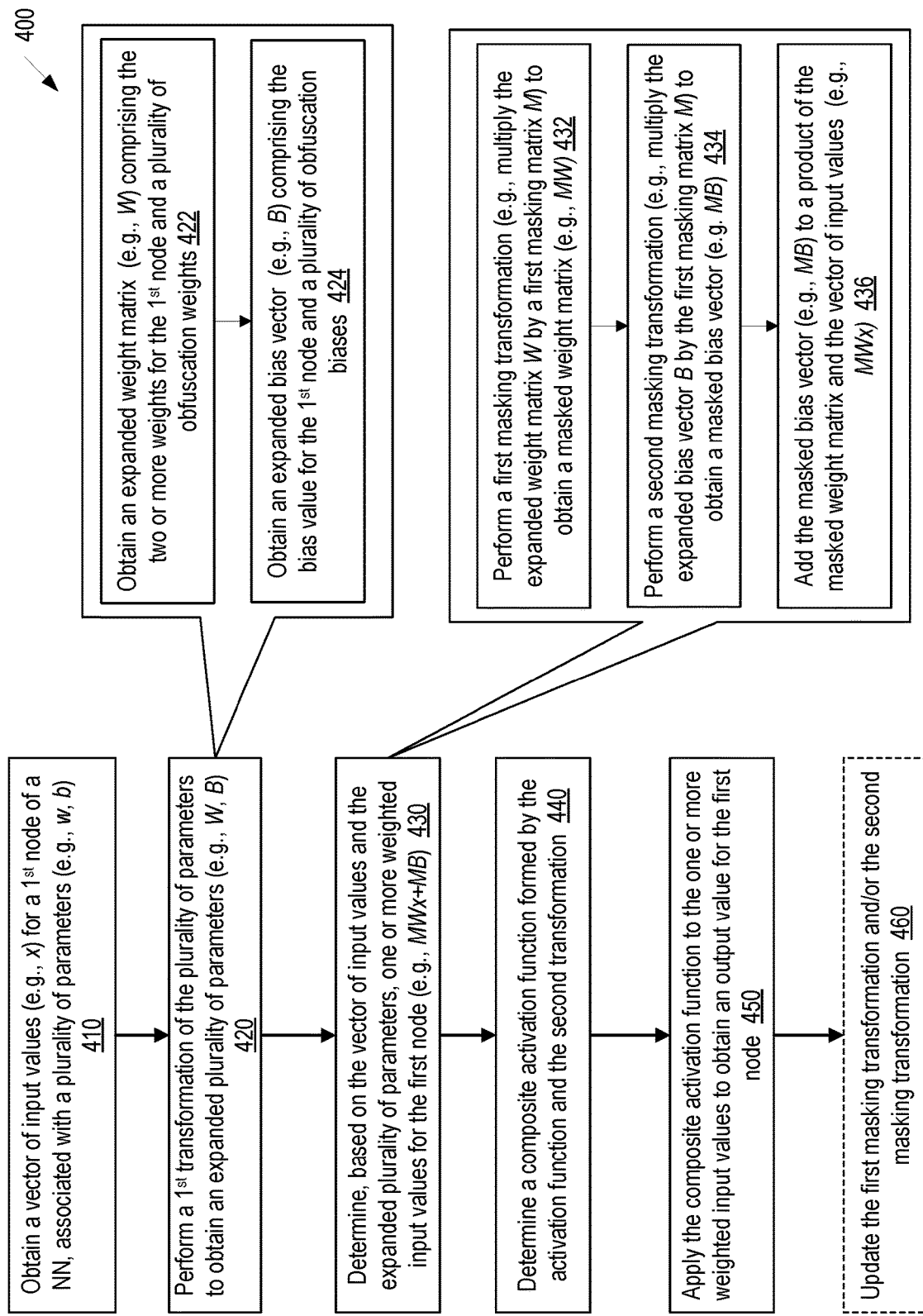
FIG. 4 depicts a flow diagram of an example method of protecting neural network operations using obfuscation of weights and biases, in accordance with one or more aspects of the present disclosure.

FIG. 4 depicts a flow diagram of an example method 400 of protecting neural network operations using obfuscation of weights and biases, in accordance with one or more aspects of the present disclosure. Method 400, as well as method 500 disclosed below, and/or each of their individual functions, routines, subroutines, or operations may be performed by one or more processing units of the computing system implementing the methods, e.g., CPU 120 and/or GPU 122 or some other processing device (an arithmetic logic unit, an FPGA, and the like, or any processing logic, hardware or software or a combination thereof). In certain implementations, each of methods 400 and 500 may be performed by a single processing thread. Alternatively, each of methods 400 and 500 may be performed by two or more processing threads, each thread executing one or more individual functions, routines, subroutines, or operations of the method. In an illustrative example, the processing threads implementing each of methods 400 and 500 may be synchronized (e.g., using semaphores, critical sections, and/or other thread synchronization mechanisms). Alternatively, the processing threads implementing each of methods 400 and 500 may be executed asynchronously with respect to each other. Various operations of each of methods 400 and 500 may be performed in a different order compared to the order shown in FIGS. 4 and 5. Some blocks may be performed concurrently with other blocks. Some blocks may be optional. Some or all of the blocks of each of methods 400 and 500 may be performed by NOE 105.

Method 400 may be implemented to protect execution of a neural network from adversarial attacks attempting to identify proprietary information about the neural network. Method 400 may involve a processing device obtaining, at block 410, a vector of input values (e.g., $\vec{x}$) for a first node of the plurality of nodes of the neural network. The terms "first" and "second" are used herein as mere identifiers and not in any limiting way. For example, a "first node" (and, similarly, a "second node") may be an arbitrary node of the neural network and should not be understood as a node that is executed before other nodes of the network. Any node of the network, e.g., the first node may be associated with a plurality of parameters that map the vector of input values (e.g., $\vec{x}$) onto a target weighted input value (e.g., z) of the first node. For example, parameters of the first node may include weights of the first node (e.g., $\vec{w}$), a bias of the first node (e.g., b), and the like. Parameters of the first node may represent a part of proprietary information that is being protected against possible attacks.

At block 420, the processing device implementing method 400 may perform a first transformation of the plurality of parameters to obtain an expanded plurality of parameters for the first node. At least some of the expanded plurality of parameters may be obfuscation parameters. In some implementations, block 420 may include operations depicted by the pertinent blowout section of FIG. 4. For example, as shown by block 422, the first transformation may include obtaining an expanded weight matrix (e.g., $\hat{W}$) that may include the one or more (actual) weights for the first node weight (e.g., $\vec{w}$) and a plurality of obfuscation (dummy) weights. Additionally, as shown by block 424, the first transformation may include obtaining an expanded bias vector that includes the (actual) bias value for the first node (e.g., b) and a plurality of obfuscation biases (e.g., $\vec{B}$).

At block 430, method 400 may include determining, based on the vector of input values (e.g., $\vec{x}$), and the expanded plurality of parameters (e.g., $\hat{W}$ and $\vec{B}$), one or more weighted input values for the first node. For example, in some implementations, the one or more weighted input values may be $\hat{W} \cdot \vec{x}^T + \vec{B}$. In some implementations, block 430 may include operations depicted by the pertinent blowout section of FIG. 4. For example, as shown by block 432, method 400 may include performing a first masking transformation to obtain a masked weight matrix from the expanded weight matrix. In one specific non-limiting example, when linear masking is used, NOE 105 may multiply the expanded weight matrix (e.g., $\hat{W}$) by a masking matrix (e.g., $\hat{M}$), to obtain a masked weight matrix (e.g., $\hat{W} \cdot \hat{M}$). At block 434, method 400 may continue with performing a second masking transformation to obtain a masked bias vector from the expanded bias vector. In one specific non-limiting example, when linear masking is used, NOE 105 may multiply the expanded bias vector (e.g., $\vec{B}$) by the masking matrix to obtain a masked bias vector (e.g., $\hat{W} \cdot \vec{B}$). At block 436, method 400 may further include adding the masked bias vector (e.g., $\hat{W} \cdot \vec{B}$) to a product of the masked weight matrix (e.g., $\hat{W} \cdot \hat{M}$) and the vector of input values (e.g., $\vec{x}$), e.g., computing $\vec{Z}_M = \hat{W} \cdot \hat{M} \cdot \vec{x}^T + \hat{W} \cdot \vec{B}$. The determined one or more weighted input values (e.g., vector $\vec{Z}_M$) may be different from a target weighed input value (e.g., z), but may include information that is sufficient to recover the target weighted input value. More specifically, the target weighted input value may be obtainable from the one or more weighted input values using a second transformation, e.g., using multiplication of $\vec{Z}_M$ by the unmasking vector: $z = \vec{U} \cdot \vec{Z}_M$. (Although the second transformation does not have to be performed explicitly, and may be instead composed with the activation function, as described below.)

At block 440, method 400 may continue with the processing device determining a composite activation function formed by the activation function and the second transformation. For example, a composite activation function may be $(f \circ \vec{U})(\vec{Z}_M)$, where f represents the activation function and $\vec{U}$ represents the second transformation that recovers z from $\vec{Z}_M$. At block 450, method 400 may continue with the processing device applying the composite activation function, $(f \circ \vec{U})$, to the one or more weighted input values (e.g., vector $\vec{Z}_M$) for the first node to obtain an output value for the first node. In some implementations, the output value may be the actual target output value y that equal to a value of the activation function applied to the target weighted input value (e.g., y=f(z)). In some implementations, however, the output may be representative of the target output value f(z), but may be different from the target output value f(z), e.g., be an obfuscated target output value.

At optional block 460, method 400 may continue with the processing device updating at least one of the first masking transformation or the second masking transformation. In one non-limiting example, where linear masking is used, the processing device may obtain an updated masked weight matrix (e.g., $\hat{M}' \cdot \hat{W}$) by multiplying the masked weight matrix (e.g., $\hat{W}$) by a second masking matrix (e.g., $\hat{M}'$). In some implementations, the second masking matrix may be selected randomly. The processing device may further obtain an updated masked bias vector (e.g., $\hat{M}' \cdot \vec{B}$) by multiplying the masked bias vector by the second masking matrix.

Figure 5:
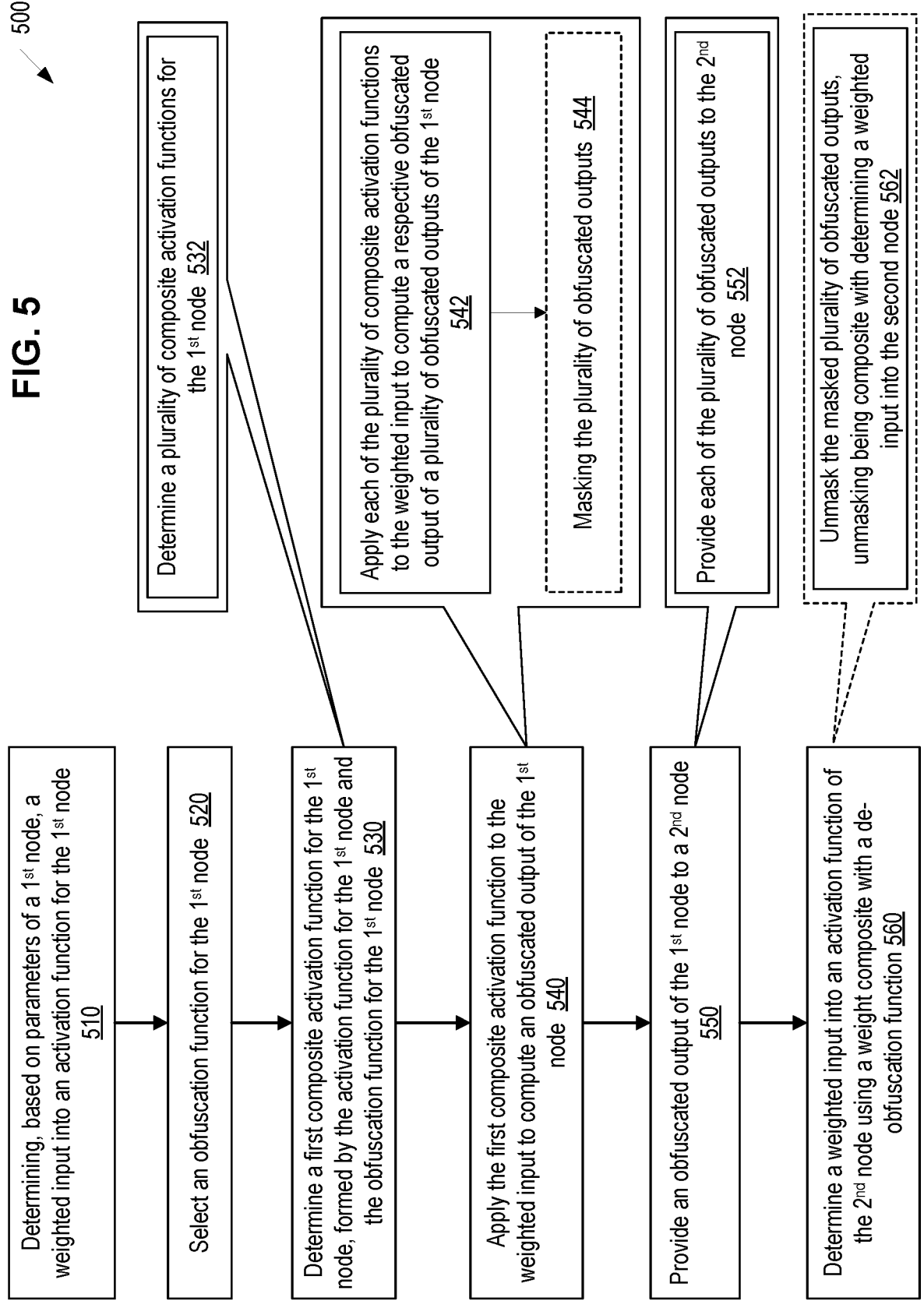
FIG. 5 depicts a flow diagram of an example method of protecting neural network operations using activation function obfuscation, in accordance with one or more aspects of the present disclosure.

FIG. 5 depicts a flow diagram of an example method 500 of protecting neural network operations using activation function obfuscation, in accordance with one or more aspects of the present disclosure. Method 500 may be implemented by CPU 120, GPU 122, or some other processing device (an arithmetic logic unit, an FPGA, and the like, or any processing logic, hardware or software or a combination thereof). At block 510, processing device implementing method 500 may determine, based on parameters (e.g., weights and biases) of a first node of a neural network, a weighted input (e.g., z or $\vec{Z}_M$) into an activation function (e.g., f(z)) for the first node. In some implementations, the weighted input into the first node may be obtained using a plurality of masked weights of the first node, and other obfuscation techniques described in conjunction with method 400 of FIG. 4.

At block 520, method 500 may continue with the processing device selecting an obfuscation function (e.g., g(f)) for the first node. In some implementations, the obfuscation function may be an invertible function. At block 530, method 500 may continue with the processing device determining a first composite activation function (e.g., (g∘f)(z)) for the first node, wherein the composite activation function is formed by the activation function for the first node (e.g., f(z)) and the obfuscation function for the first node (e.g., g(f)). In some implementations, block 530 may include operations depicted by the pertinent blowout section of FIG. 5. For example, the first composite activation function may be one of a plurality of composite activation functions defined for the first node, each of the plurality of composite activation functions (e.g., $\{g_j \circ f_j\}$) being based on a respective activation function of a plurality of activation functions (e.g., $\{f_j\}$) for the first node and a respective obfuscation function of a plurality of obfuscation functions (e.g., $\{g_j\}$) for the first node.

At block 540, method 500 may continue with the processing device applying the first composite activation function to the weighted input (e.g., z or $\vec{Z}_M$) to compute an obfuscated output (e.g., O) of the first node. In some implementations, block 540 may include operations depicted by the pertinent blowout section of FIG. 5. For example, at block 542, processing device implementing method 500 may apply each of the plurality of composite activation functions (e.g., $\{g_j \circ f_j\}$) to the weighted input to compute a respective obfuscated output (e.g., $O_j$) of a plurality of obfuscated outputs (e.g., $\{O_j\}$ or, equivalently, $\vec{O}$) of the first node. At block 544, processing device implementing method 500 may mask the plurality of obfuscated outputs (e.g., apply a masking matrix to the obfuscated outputs: $\vec{O}_{masked} = \hat{M} \cdot \vec{O}$).

At block 550, method 500 may continue with the processing device providing an obfuscated output (e.g., O) of the first node to a second node of the plurality of nodes of the neural network. In some implementations, block 550 may include operations depicted by the pertinent blowout section of FIG. 5. For example, in those implementations where multiple obfuscated outputs (e.g., $\{O_j\}$) are generated, the processing device implementing method 500 may, at block 552 provide each of the plurality of obfuscated outputs $\{O_j\}$ to the second node.

At block 560, method 500 may continue with the processing device determining a weighted input into an activation function of the second node. For example, the processing device may apply, to the provided obfuscated output (e.g., O) of the first node, a weight of the second node (e.g., $\{w \circ g^{-1}\}$) composite with a de-obfuscation function (e.g., $g^{-1}$). In some implementations, the weighted input into the activation function of the second node may be obtained using a plurality of masked weights of the second node, e.g., as described in conjunction with method 400 of FIG. 4. In some implementations, block 560 may include operations depicted by the pertinent blowout section of FIG. 5. For example, in those implementations where obfuscated outputs are additionally masked (at block 544), the processing device performing method 500 may unmask the masked plurality of obfuscated outputs (e.g., using an unmasking vector $\vec{U}$ as described in conjunction with FIG. 3B). In some implementations, the unmasking may be composite with determining a weighted input into the second node. In some implementations, the unmasking may further be composite with one or more de-obfuscation functions.

FIGS. 6A-E illustrate example operations 600 of protection of neural network architecture by obfuscation using dummy operations, in accordance with one or more aspects of the present disclosure. Various implementations illustrated enable to obfuscate the actual architecture of a neural network by performing operations that are inconsequential (do not affect the outcome of the neural network execution) while at the same time presenting a potential attacker with a wider range of operations to track and analyze. Additionally, the inconsequential operations can further be (at regular or random times) changed in any manner that keeps such operations inconsequential, further hindering collection of meaningful statistics for the attacker. In some implementations, inconsequential operations may extend to an entire node ("dummy node") that does not change the flow of relevant (consequential) data. In some implementations, inconsequential operations may extend to an entire layer of dummy nodes. Dummy operations, dummy nodes, and dummy layers may not only make it more difficult for an attacker to identify parameters of nodes, but also obfuscate the topology (number of nodes, layers, edges) of the neural network.

FIG. 6A illustrates an example implementation of a constant-output node that may be used for obfuscation of neural network operations. A constant-output node 602 may be configured to output a constant value (e.g., $y_0$) regardless of the input values (e.g., $\{x_i\}$). For example, a constant-output node may have an activation function, e.g., a Heaviside step function composite with an exponential function, $\Theta(\exp(\Sigma_i w_i x_i))$, or composite with a sigmoid function, or any other activation function or a combination of activation functions that outputs a constant value $y_0$ (indicated by the dashed arrow). The value $y_0$ may be positive, negative, or zero. Because inputs $\{x_i\}$ do not affect value $y_0$, the inputs may be outputs of real nodes or dummy nodes, may be obfuscated or unobfuscated, may be inputs from any layer of the neural network, from multiple layers, and so on. Constant output $y_0$ may be provided to one or more nodes, such as a constant-adjusting node 604 that are configured to handle such constant outputs in a way that does not affect the actual flow of data within the network. For example, constant-adjusting node 604 may weigh the output $y_0$ from constant-output node 602 with a weight $w_0$ and also adjust a bias value from a desired (target) value $b_T \to b$ to the value $b=b_T - w_0 y_0$. Upon such an adjustment, constant-adjusting node 604 may be capable of handling outputs from other nodes (solid arrows) without affecting actual computations performed by the neural network (e.g., by constant-adjusting node 604 and various other downstream nodes). In some implementations, e.g., where a constant-output node outputs zero value $y_0=0$ (zero-output node), no adjustment needs to be performed by constant-adjusting node 604 or other downstream nodes. In some implementations, the constant-output character of the node may be obfuscated using multiple output values produced by multiple activation functions, as disclosed above in conjunction with FIG. 3B.

Figure 6B:
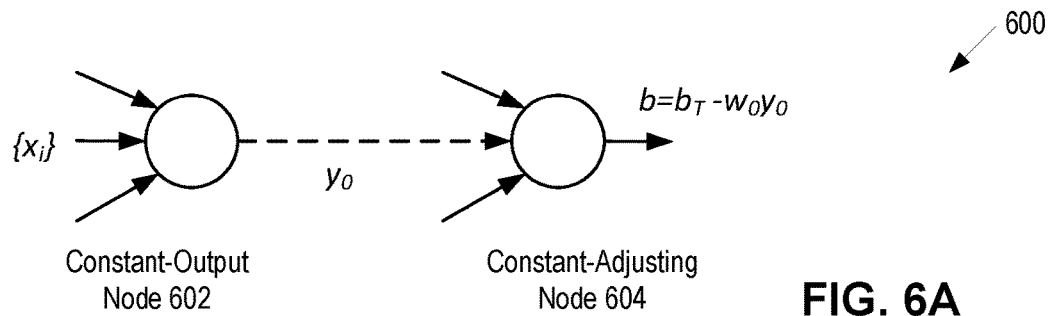
Figure 6B:
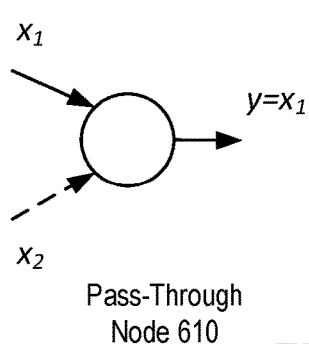

FIG. 6B illustrates an example implementation of a pass-through node that may be used for obfuscation of neural network operations. A pass-through node 610 may have an input (or a plurality of inputs) $x_1$ that is passed-through without modification even though another input (or a plurality of inputs) $x_2$ is being processed by the same node. In some implementations, output of pass-through node 610 is independent of a specific value (or values) $x_2$. For example, operations of pass-through node 610 may include weighting input values using at least one non-linear weight function, e.g., $z=w_i(x_1)+w_2(x_2)+b$. The weight function $w_2(x_2)$ for the input $x_2$ may be an obfuscation function that performs computations that ultimately do not change the weighted input $z$ into the node but involve a sequence of operations (multiplications, additions, exponentiations, etc.) whose overall effect is null. For example, a non-linear weight function may be $w_2(x)=\ln(e^x+1)-x-\ln(1+e^{-x})$. Determining the weighted input $z=w_1(x_1)+w_2(x_2)+b$ may involve mixing (scrambling) computations of different steps (terms) of the weight function $w_2(x_2)$ with steps in computation of $w_i(x_1)+b$, for additional protection against adversarial attacks. The weighted input $z=w_i(x_1)+b$ may then be processed by an activation function $f(z)$ of pass-through node 610 that restores the input $x_1$, e.g., $f(w_i(x_1)+b)=x_1$. The pass-through character of such a node may be further obfuscated with various techniques described in relation to FIGS. 2A-2B and 3A-3B.

Figure 6C:
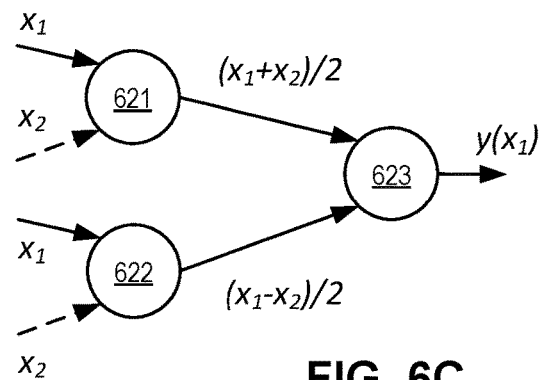

FIG. 6C illustrates an example implementation of a pass-through cluster of nodes that may be used for obfuscation of neural network operations. Depicted schematically is a cluster that includes three nodes 621, 622, and 623, but any number of nodes may be arranged in a pass-through cluster. Input nodes 621 and 622 may have inputs (or a plurality of inputs) $x_1$ that are passed-through while another input (or a plurality of inputs) $x_2$ is processed for the purpose of obfuscation. First node 621 may output a first function of $x_1$ and $x_2$ (shown, for illustration purposes only is an even combination of $x_1$ and $x_2$) whereas second node 622 may output a second function of $x_1$ and $x_2$ (shown, for illustration, is an odd combination of $x_1$ and $x_2$). Subsequently, when third node 623 processes the first function and the second function, third node 623 may output a value, e.g., $y(x_1)$ that is determined by first input $x_1$ only, but not by second input $x_2$. In some implementations, the output of third node 623 may be the same as first input $x_1$ (a pure pass-through cluster). In some implementations, the output of third node 623 may be masked, e.g., $y(x_1)=m_1 \cdot x_1 + m_2$ (a masking pass-through cluster). In some implementations, the cluster of nodes may additionally perform substantive computations meaning such that $y(x_1)$ is not equal to $x_1$ or its masked representation. Outputs of nodes 621 and 623 may additionally be input into one or more dummy nodes, such as various zero-output and constant output-nodes to make it more difficult for a potential attacker to identify the pass-through character of the cluster.

Figure 6D:
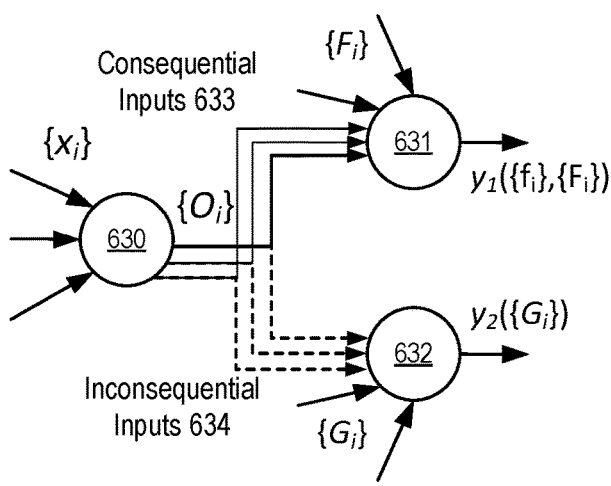

FIG. 6D illustrates an example implementation of dummy (inconsequential) outputs from a node that may be used for obfuscation of neural network operations. Shown is a node 630 that outputs multiple output values $\{O_i\}$ into nodes 631 and 632. Node 631 may use output values $\{O_i\}$ for real computations whereas node 632 may use the same output values for dummy computations. Accordingly, outputs $\{O_i\}$ are consequential inputs 633 when input into node 631 (the inputs affect the output of the neural network execution) but are inconsequential inputs 634 when input into node 632 (do not affect the output of the neural network execution). In some implementations, producing outputs that may be used as both consequential and inconsequential inputs into other nodes may include receiving node 630 inputs $\{x_i\}$ and determining node 630 weighted input value $z$ (which, in some implementations, may be obfuscated using techniques disclosed above). Node 630 may deploy multiple activation functions $\{f_i\}$ with functions $f_2, f_3, \ldots$ serving to obfuscate an actual activation function $f_1$ of node 630. To further obfuscate which one of the activation functions $\{f_i\}$ is the actual activation function, output values $\{O_i\}$ may be obtained using a transformation of $\{f_i\}$. In some implementations, a linear obfuscating transformation may be deployed, e.g., using a masking matrix $\hat{M}$ to transform the vector of values $\vec{f}(z)$ (having components equal to various functions of the set $\{f_i\}$) into a vector of output values $\vec{O}$: $\vec{O} = \hat{M} \cdot \vec{f}(z)$. Vector $\vec{O}$ received by node 631 may be processed by a set (vector) of weights $\vec{w}_1$ to obtain a weighted node 630 input, e.g., $\vec{w}_1 \cdot \hat{M} \cdot \vec{f}(z)$. For this weighted input to be equal to the actual output $f_1(z)$ of node 630, weights $\vec{w}_1$ of node 631 may be selected such that $\vec{w}_1 \cdot \hat{M}$ is the vector with a first component equal to 1 and all other components equal to 0. For example, the weights may be $\vec{w}_1 = (1, 0, 0, \ldots) \cdot \hat{M}^{-1}$. Accordingly, node 631 may be capable of identifying (and processing) correct inputs among consequential inputs 633. Additionally, node 631 may receive other inputs $\{F_i\}$ from other nodes and process inputs $\{F_i\}$ together with the identified input $f_1(z)$ of node 630. Consequently, output of node 631 may be a function of inputs $f_1$ and $\{F_i\}$: $y_1(f_1, \{F_i\})$.

When inconsequential inputs 634 (which may be the same values $\{O_i\}$ or, equivalently, the same vector $\vec{O}$) are provided to node 632, node 632 may apply a different set (vector) of weights $\vec{w}_2$ to obtain a weighted node 630 input, e.g., $\vec{w}_2 \cdot \hat{M} \cdot \vec{f}(z) \equiv \vec{v} \cdot \vec{f}(z)$, where $\vec{v} = \vec{w}_2 \hat{M}$. To ensure that inputs 634 are inconsequential, weights $\vec{w}_2$ may be selected to make the product $\vec{v} \cdot \vec{f}(z)$ vanish for all values z. For example, component $v_1$ may be zero: $v_1 = 0$. Vanishing of the remaining inputs may be achieved by selecting the obfuscation functions to be linearly-dependent, e.g., such that there exists a relationship, $$f_2(z) = -\frac{1}{v_2}(v_3 f_3(z) + \ldots)$$

Under such a condition (or similar conditions), and provided that the weights $\vec{w}_2$ and the masking matrix $\hat{M}$ are chosen to obey the condition, $\vec{v} = \vec{w}_2 \cdot M$, output of node 632 may be independent of inconsequential inputs 634. Additionally, mode 631 may receive other inputs $\{G_i\}$ from other nodes and process inputs $\{G_i\}$ together with inconsequential inputs 634. As a result, output of node 632 may be a function of inputs $\{G_i\}$: $y_2(\{G_i\})$. In various implementations, the number of obfuscating functions $f_2(z)$, $f_3(z)$, ... may differ. In some implementations, only two functions $f_2(z)$ and $f_3(z)$ may be used. Even though the two functions $f_2(z)$ and $f_3(z)$ may essentially amount to the same function (up to multiplication by a constant factor), NOE 105 may vary how the respective functions are computed so that the similarity of the two (or more) functions is obfuscated to protect against an adversarial attack. For example, one of the functions may be $$f_2(z) = (z^2 + 1)^2,$$

whereas the other function may be $$f_3(z) = \tfrac{1}{2} \cdot (2 \cdot z^2 - 1)^2 + \tfrac{3}{2} + 6 \cdot z^2.$$

Even though $f_3(z) = 2 \cdot f_2(z)$, this fact may not be easily determinable by an attacker, especially if operations of computing different obfuscation functions are scrambled (e.g., with the processing device computing different functions not fully sequentially, but rather in batches, with batches of computations related to various functions interspersed with batches of computations related to other functions. More than two functions may be used for added protection. In some implementations, functions (both in number and specific form) may be changed at certain time intervals, periodically, or after a certain number of NN operations.

Although linear transformations from $\{f_i\}$ to output values $\{O_i\}$ have been used (for conciseness and ease of notations) to illustrate operations performed in conjunction with FIG. 6D, various non-linear (invertible) transformations may be used for this purpose instead.

Figure 6E:
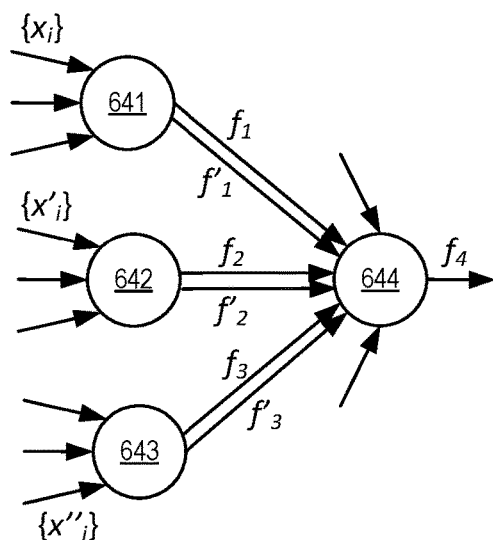

FIG. 6E illustrates an example implementation of node clusters having cancelling outputs that may be used for obfuscation of neural network operations. Depicted schematically is a cluster that includes four nodes 641, 642, 643, and 644, but any number of nodes may be similarly arranged. Input nodes 641, 642, and 643 may have different sets (vectors) of inputs $\vec{x}_1$, $\vec{x}_2$ and $\vec{x}_3$. In some implementations, the vectors of inputs may be arbitrary and independent of each other. Each of the nodes may output one or more activation functions, e.g., node 641 may output activation functions $f_1$ and $f'_1$, node 642 may output activation functions $f_2$ and $f'_2$, and node 643 may output activation functions $f_3$ and $f'_3$. Activation functions in respective pairs may be different from each other but may be correlated, e.g., function $f_1$ may be the sigmoid function $f_1 = S(z_1)$ of a (weighted) input into node 641, whereas respective function $f'_1$ may be $f'_1 = S(-z_1)$. For any value $z_1$, the two outputs of node 641 may add up to a constant, e.g., $f_1 + f'_1 = 1$ in this example. Similar conditions may be satisfied by other pairs of outputs, e.g., functions $f_2$ and $f'_2$ may be the Heaviside functions, $f_2 = \Theta(z_2)$ and $f'_2 = \Theta(-z_2)$, and so on. Node 644 may combine activation functions from the three input nodes and output a constant value. For example, a weighted input value into an activation function of node 644 may be $z_4 = f_1 + f'_3 + f'_1 + f_2 + + f'_2$. The order of summation may be mixed to obfuscate the fact that pairs of respective outputs add up to a constant (e.g., 3). An arbitrary activation function $f_4$ of node 644 may then be applied to a (constant) weighted input value to produce a constant output, $f_4(z_4)$. In some implementations, a bias value of node 644 may be chosen to ensure that the output of the cancelling cluster, $f_4(z_4+b)$, is always zero, although any other constant value may be output. Node 644 may have additional inputs (shown by arrows) whose contributions into the output of node 644 do not cancel. Accordingly, node 644 may serve both as an obfuscating node and an active node that contributes to NN operations.

Various implementations of dummy operations disclosed in conjunction with FIGS. 6A-E may be combined with each other. For example, a pass-through node of FIG. 6B may be combined with a canceling node of FIG. 6E. Any and all operations disclosed in conjunction with FIGS. 6A-E may be obfuscated using any of the techniques disclosed in relation to FIGS. 2A-B, FIGS. 3A-B, FIG. 4, and FIG. 5, including (but not limited to) obfuscation by weight and bias expansion, obfuscation by masking, activation function obfuscation, by splitting of activation functions, and the like.

Various implementations of dummy operations disclosed in conjunction with FIGS. 6A-E are intended for illustration purposes only. A practically unlimited number of other implementations, variations, and combinations of dummy operations and dummy nodes are possible.

In some implementations, multiple nodes having inconsequential inputs, which may include pass-through nodes, constant-output nodes, canceling nodes, or any other nodes described in relation to FIGS. 6A-E may be joined into multi-node clusters. In some implementations, an entire dummy layer of pass-through nodes may be formed to obfuscate a total number of layers in a NN and other features of the architecture of the NN. In some implementations, dummy nodes may be used to obfuscate a number of nodes in various layers of the NN. In some implementations, dummy nodes may be used to mask a nature of the NN, e.g. to present (to an attacker) a convolutional network (or a convolutional sub-network of a larger network) as a deconvolutional NN or a NN of fully-connected layers. For example, a portion of a layer may be made of dummy nodes (e.g. constant-output nodes), with the nodes of the next layer connected to the dummy nodes adjusting or canceling the inputs from the dummy nodes. The pass-through nature of dummy nodes and dummy layers may be obfuscated with some or all obfuscation techniques disclosed above in relation to FIGS. 2A-B, FIGS. 3A-B, FIG. 4, and FIG. 5.

Figure 7:
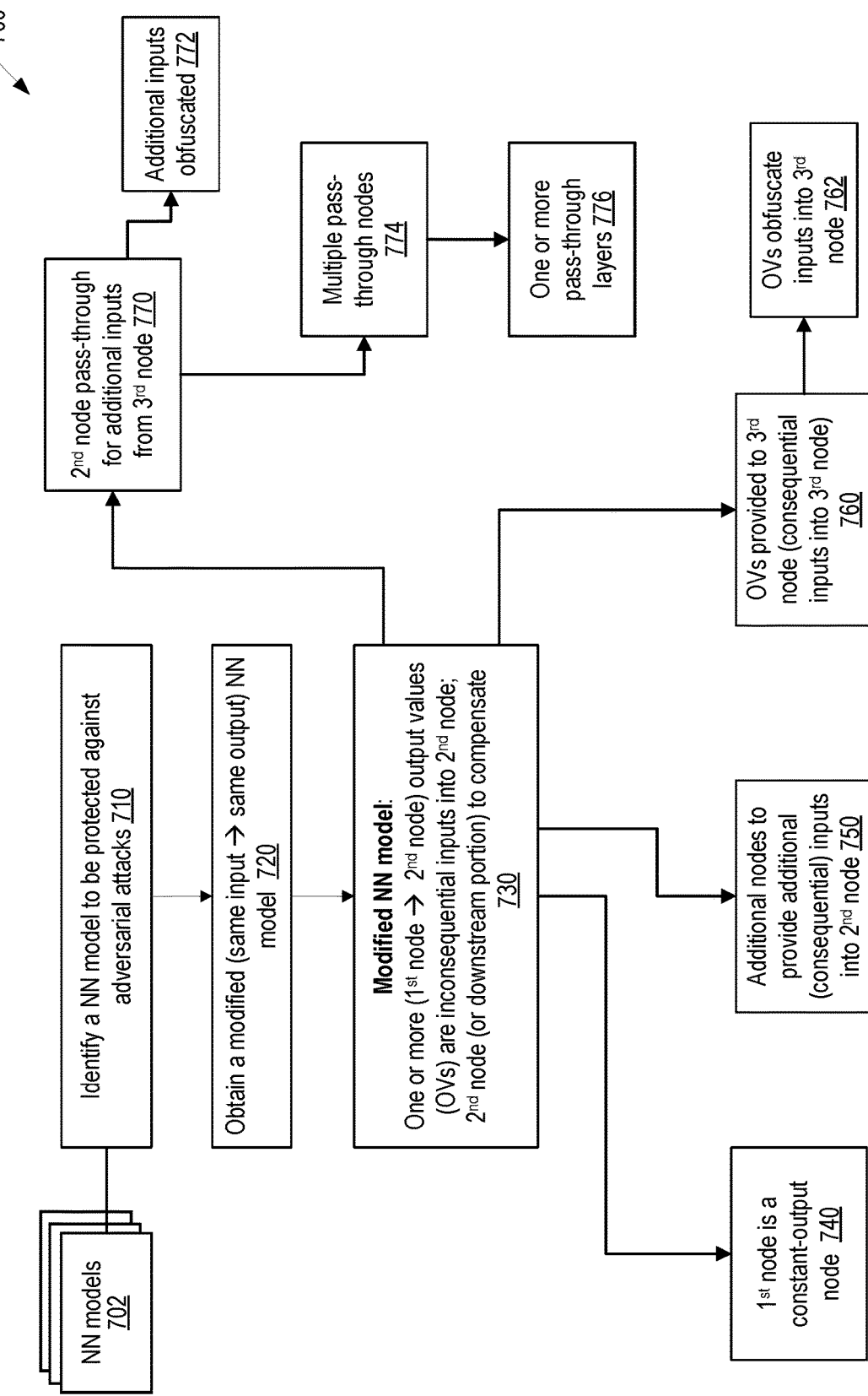
FIG. 7 depicts a flow diagram of an example method of protecting neural network operations using obfuscation of neural network architecture, in accordance with one or more aspects of the present disclosure.

FIG. 7 depicts a flow diagram of an example method 700 of protecting neural network operations using obfuscation of neural network architecture, in accordance with one or more aspects of the present disclosure. Method 700 and/or each of its individual functions, routines, subroutines, or operations may be performed by one or more processing units of the computing system implementing the methods, e.g., CPU 120 and/or GPU 122. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Various operations of method 700 may be performed in a different order compared to the order shown in FIG. 7. Some blocks may be performed concurrently with other blocks. Some blocks may be optional. Some or all of the blocks of each of method 700 may be performed by NOE 105.

Method 700 may be implemented to protect execution of a neural network (NN) model from adversarial attacks attempting to identify proprietary information about the NN model. Multiple NN models 702 may be protected using method 700. Method 700 may involve a processing device identifying, at block 710, a specific neural (NN) model to be protected. The identified NN model may be configured to generate, based on an input into the NN model, a target output of the NN model. For example, the input into the NN model may be a digital representation of an image of a document and the target output may be a recognized text contained in the document. In another example, the input may be a digital representation of a human voice and the target output may be an identified owner of the voice. The identified model may include multiple layers of nodes, each layer having multiple nodes. Each node may be associated with multiple weights (to weight input values from various input nodes), a bias, and one or more activation functions, and may output computed values to any number of downstream nodes.

At block 720, method 700 may continue with the processing device obtaining a modified NN model 730. Modification of the NN model may include obfuscation (e.g., by expansion, masking, randomization, etc.) of the existing operations of the NN model, such as configuring existing nodes to modify weights, biases, activation functions, generating additional inputs/outputs into/from various nodes, and so on. Modifications of the NN model may be performed in such a way that the modified NN model 730 is configured to output the same target output(s) based on the same input(s) as the identified NN model is configured to output. Correspondingly, the modified NN model 730 may function similarly to the unmodified NN model, but operations of the modified NN model 730 may be protected against adversarial attacks.

In some implementations, obtaining the modified model 730 may include configuring a first node to provide one or more output values to a second node, wherein the one or more output values provided by the first node may include one or more inconsequential input values into the second node (block 740). For example, with reference to FIG. 6D, first node 630 may provide inconsequential input values 634 to second node 632. The inconsequential input values may have no effect on the output of the modified neural network model 730. For example, the second node (e.g., node 634) may be configured to perform one or more operations to compensate for the inconsequential input values. For example, the processing device performing method 700 may change weights and biases of the second node to cancel out the inconsequential input values. In some implementations, compensation for the inconsequential input values may be performed not by operations of the second node, but by other nodes within a downstream (relative to the second node) portion of the modified NN model 730. Downstream portion may include the second node and any other nodes whose computations are performed after computations of the second node and are connected to the second node by one or more edges. Downstream portion may be configured to compensate for the one or more inconsequential input values into the second node at some point prior to (or concurrently with) producing the target output of the modified NN model. The terms "first" and "second" are used herein as mere identifiers and may identify arbitrary nodes of the NN model.

In some implementations, the modified NN model 730 may include a variety of operations depicted by blocks 740-772 showing a number of illustrative non-limiting examples. In some implementations, one or more inconsequential input values into the second node may include at least one constant input value (block 740) output by the first node, e.g., node 602 of FIG. 6A. The first node may output the constant value for multiple inputs into the first node. In some implementations, the first node may output the same constant value for all inputs into the first node. In some implementations, the constant input value may be zero. Accordingly, compensation for the constant input value into the second node may be performed automatically when the constant zero input is multiplied by a respective weight of the second node that weights the input values provided by the first node. In some implementations, the constant input value may be non-zero and the second node may be configured to compensate for the constant input value. For example, the second node may be constant-adjusting node 604 described in conjunction with FIG. 6A.

In some implementations, the second node may be a dummy node and may perform only computations (dummy computations) that do not affect the ultimate output of the modified NN model. In some implementations, however, the second node may perform both dummy computations and actual (consequential) computations. For example, the second node may be node 632 of FIG. 6D, which may receive additional input values (e.g., {$G_i$}) from one or more additional nodes of the modified NN model (block 750). The additional input values may be consequential input values for the second node and may be a part of the actual computations carried out by the NN model.

In some implementations, the modified NN model may include a third node (block 760). The first node may provide the one or more input values into the third node. For example, the third node may be node 631 of FIG. 6D and may receive the same inputs from the first node (node 630) as received by the second node 632. The input values received by the third node may be consequential input values for the third node and may be a part of the actual computations carried out by the NN model. In some implementations, the one or more output values of the first node, provided as input values to the third node, may be obfuscated (block 762) using any of the techniques described in the present disclosure. Subsequently, operations of the third node may include application of a de-obfuscation transformation to de-obfuscate the one or more values output by the first node.

In some implementations, the second node may be a pass-through node (block 770) configured to receive one or more additional input values from a third node. An output of the second node may be based on the one or more additional input values and may be independent of the one or more inconsequential input values into the second node. For example, a pass-through node may be node 610 illustrated in FIG. 6B. The inconsequential input (e.g., $x_2$) may be received from the first node (along the edge indicated by the dashed arrow) and the additional input (e.g., $x_1$) may be received from the third node (along the edge indicated by the solid arrow). The additional input values may be consequential input values for the second node and may be a part of the actual computations carried out by the NN model. In some implementations, the output of the second node may be the same as the one or more additional input values received from the third node, such as $y=x_1$ (a pure pass-through node). In some implementations, the output of the second node may include an obfuscated representation (block 772) of the one or more additional input values, e.g., a masked representation, $y=m_1 \cdot x_1 + m_2$ (a masking pass-through node). Various downstream nodes receiving outputs from the second node may then adjust to compensate for the masking.

In some implementations, the second (pass-through) node may be one of multiple pass-through nodes (block 774) added to the modified NN model. Pass-through nodes may be randomly interspersed with nodes performing actual computations of the NN model. In some implementations, pass-through nodes may constitute portions of various (including multiple) layers of nodes added to the modified NN model. In some implementations, pass-through nodes of the modified NN model may form one or more full layers of pass-through nodes to obfuscate topology of the modified NN model.

Figure 8:
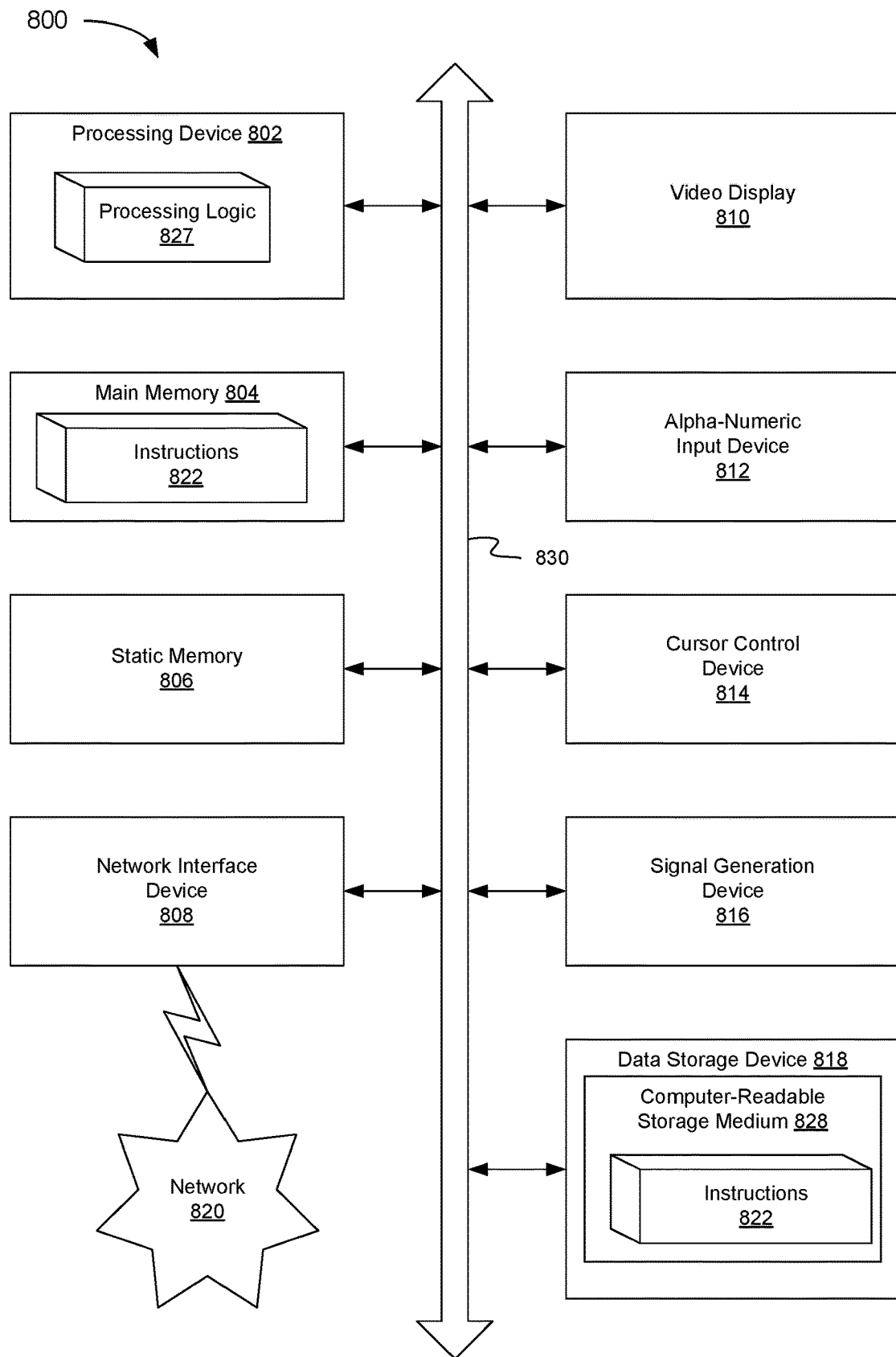
FIG. 8 depicts a block diagram of an example computer system operating in accordance with one or more aspects of the present disclosure.

FIG. 8 depicts a block diagram of an example computer system 800 operating in accordance with one or more aspects of the present disclosure. In various illustrative examples, computer system 800 may represent the computer device 102, illustrated in FIGS. 1A-B.

Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 802 (also referred to as a processor or CPU), which may include processing logic 827, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing method 400 of protecting neural network operations using obfuscation of weights and biases, method 500 of protecting neural network operations using activation function obfuscation, and method 700 of protecting neural network operations using obfuscation of neural network architecture.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing method 400 of protecting neural network operations using obfuscation of weights and biases, method 500 of protecting neural network operations using activation function obfuscation, and method 700 of protecting neural network operations using obfuscation of neural network architecture.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    modifying a neural network (NN) model to obtain a modified NN model, wherein each of the NN model and the modified NN model is configured, when applied to an input, to generate a same output, wherein the modified NN model comprises:
        a first node to provide one or more output values to a second node, wherein the one or more output values provided by the first node comprise one or more inconsequential input values into the second node; and
        a downstream portion of the modified NN model, the downstream portion comprising the second node and configured to compensate for the one or more inconsequential input values into the second node.

2. The method of claim 1, wherein the one or more inconsequential input values into the second node comprise a constant input value output by the first node for each of a plurality of inputs into the first node.

3. The method of claim 2, wherein the constant input value is zero.

4. The method of claim 2, wherein the constant input value is non-zero, and wherein the second node is configured to compensate for the constant input value.

5. The method of claim 4, wherein the modified NN model further comprises one or more additional nodes that are configured to output one or more additional input values into the second node.

6. The method of claim 1, wherein the modified NN model further comprises a third node, and wherein the first node is further to provide the one or more input values into the third node.

7. The method of claim 6, wherein the one or more output values comprise an obfuscated input into the third node, and wherein the third node is to apply a de-obfuscation transformation to the one or more output values.

8. The method of claim 1, wherein the second node is a pass-through node configured to receive one or more additional input values from a third node, and wherein an output of the second node is based on the one or more additional input values and is independent of the one or more inconsequential input values into the second node.

9. The method of claim 8, wherein the output of the second node comprises an obfuscated representation of the one or more additional input values.

10. The method of claim 8, wherein the second node is a node of a plurality of pass-through nodes of the modified NN model.

11. The method of claim 10, wherein the plurality of pass-through nodes comprises one or more layers of pass-through nodes.

12. A method comprising:
applying a neural network (NN) model to an input to generate an output, wherein the NN model is modified, from a reference NN model, by one or more obfuscation operations, wherein each of the NN model and the reference NN model is configured, being applied to the input, to generate the same output, and wherein the one or more obfuscation operations comprise:
a first node to provide one or more output values to a second node, wherein the one or more output values provided by the first node comprise one or more inconsequential input values into the second node; and
a downstream portion of the NN model, the downstream portion comprising the second node and configured to compensate for the one or more inconsequential input values into the second node.

13. The method of claim 12, wherein the second node is a pass-through node configured to receive one or more additional input values from a third node, and wherein an output of the second node is based on the one or more additional input values and is independent of the one or more inconsequential input values into the second node.

14. A system comprising:
a memory device; and
a processing device communicatively coupled to the memory device, the processing device to:
modify a neural network (NN) model to obtain a modified NN model, wherein each of the NN model and the modified NN model is configured, when applied to an input, to generate a same output, wherein the modified NN model comprises:
a first node to provide one or more output values to a second node, wherein the one or more output values provided by the first node comprise one or more inconsequential input values into the second node; and
a downstream portion of the modified NN model, the downstream portion comprising the second node and configured to compensate for the one or more inconsequential input values into the second node.

15. The system of claim 14, wherein the one or more inconsequential input values into the second node comprise a constant input value output by the first node for each of a plurality of inputs into the first node.

16. The system of claim 14, wherein the modified NN model further comprises a third node, and wherein the first node is further to provide the one or more input values into the third node.

17. The system of claim 16, wherein the one or more output values comprise an obfuscated input into the third node, and wherein the third node is to apply a de-obfuscation transformation to the one or more output values.

18. The system of claim 14, wherein the second node is a pass-through node configured to receive one or more additional input values from a third node, and wherein an output of the second node is based on the one or more additional input values and is independent of the one or more inconsequential input values into the second node.

19. The system of claim 18, wherein the second node is a node of a plurality of pass-through nodes of the modified NN model.

20. A method comprising:
applying a neural network (NN) model to an input to generate an output, wherein the NN model is modified, from a reference NN model, by one or more obfuscation operations, wherein each of the NN model and the reference NN model is configured, being applied to the input, to generate the same output, and wherein the one or more obfuscation operations comprise:
a first node to provide one or more output values to a second node, wherein the one or more output values provided by the first node comprise one or more inconsequential input values into the second node; and
a downstream portion of the NN model, the downstream portion comprising the second node and configured to compensate for the one or more inconsequential input values into the second node.

* * * * *